United States Patent
Kim et al.

(10) Patent No.: US 11,641,637 B2
(45) Date of Patent: May 2, 2023

(54) METHOD AND APPARATUS FOR SUPPORTING PAGING IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Alexander Sayenko, Suwon-si (KR); Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,980

(22) PCT Filed: May 10, 2019

(86) PCT No.: PCT/KR2019/005622
§ 371 (c)(1),
(2) Date: Nov. 9, 2020

(87) PCT Pub. No.: WO2019/216686
PCT Pub. Date: Nov. 14, 2019

(65) Prior Publication Data
US 2021/0243721 A1    Aug. 5, 2021

(30) Foreign Application Priority Data
May 10, 2018    (KR) .......................... 10-2018-0053748

(51) Int. Cl.
*H04W 4/00*      (2018.01)
*H04W 68/00*     (2009.01)
(Continued)

(52) U.S. Cl.
CPC ........... *H04W 68/005* (2013.01); *H04W 8/26* (2013.01); *H04W 76/11* (2018.02); *H04W 76/19* (2018.02)

(58) Field of Classification Search
CPC ............... H04W 68/005; H04W 76/19; H04W 76/11; H04W 8/26
(Continued)

(56) References Cited

U.S. PATENT DOCUMENTS

| 6,782,274 B1 * | 8/2004 | Park ...................... H04W 76/10 |
| | | 455/552.1 |
| 2006/0189331 A1 * | 8/2006 | Lundsjo ................ H04W 68/12 |
| | | 455/435.2 |

(Continued)

FOREIGN PATENT DOCUMENTS

| KR | 10-2017-0125296 A | 11/2017 |
| KR | 10-2018-0015589 A | 2/2018 |

(Continued)

OTHER PUBLICATIONS

OPPO, 'Discussion UE identifier definition in RRC signalling in eLTE', R2-1801776, 3GPP TSG RAN WG2 #101, Athens, Greece, Feb. 13, 2018.

(Continued)

*Primary Examiner* — Mark G. Pannell
(74) *Attorney, Agent, or Firm* — Jefferson IP Law, LLP

(57) ABSTRACT

The present disclosure relates to a communication technique and system thereof that fuses a 5G communication system with Internet of Things (IoT) technology to support a higher data rate than a 4G system. The present disclosure may be applied to intelligent services, such as smart homes, smart buildings, smart cities, smart cars or connected cars, health care, digital education, retail, and security and safety related services, on the basis of 5G communication technologies (Continued)

and IoT-related technologies. Disclosed are a method and an apparatus for sending, by a network, a paging message to a terminal in a next generation mobile communication system.

8 Claims, 21 Drawing Sheets

(51) Int. Cl.
   *H04W 76/19* (2018.01)
   *H04W 76/11* (2018.01)
   *H04W 8/26* (2009.01)

(58) Field of Classification Search
   USPC .......................................................... 370/329
   See application file for complete search history.

(56) References Cited

U.S. PATENT DOCUMENTS

| | | | | |
|---|---|---|---|---|
| 2009/0181676 | A1* | 7/2009 | Lee | H04J 11/0093 |
| | | | | 455/436 |
| 2010/0130205 | A1* | 5/2010 | Jung | H04W 36/0066 |
| | | | | 455/435.2 |
| 2013/0136072 | A1* | 5/2013 | Bachmann | H04W 68/02 |
| | | | | 370/329 |
| 2014/0254356 | A1 | 9/2014 | Jeong et al. | |
| 2016/0205661 | A1* | 7/2016 | Ryu | H04W 68/02 |
| | | | | 455/458 |
| 2017/0180995 | A1* | 6/2017 | Deshpande | H04W 72/042 |
| 2018/0019871 | A1* | 1/2018 | Gage | H04W 12/0431 |
| 2018/0176979 | A1 | 6/2018 | Ryu et al. | |
| 2018/0295497 | A1 | 10/2018 | Kim et al. | |
| 2018/0324751 | A1* | 11/2018 | Hampel | H04W 76/27 |
| 2019/0037629 | A1 | 1/2019 | Ryu et al. | |
| 2019/0132900 | A1* | 5/2019 | Hong | H04W 76/11 |
| 2019/0261264 | A1* | 8/2019 | Lou | H04W 48/18 |
| 2020/0084746 | A1* | 3/2020 | Rune | H04W 68/02 |
| 2020/0267539 | A1* | 8/2020 | Tamura | H04W 48/20 |
| 2020/0281031 | A1* | 9/2020 | Wang | H04W 12/37 |
| 2021/0092706 | A1* | 3/2021 | Ozturk | H04W 12/106 |

FOREIGN PATENT DOCUMENTS

| | | |
|---|---|---|
| WO | 2013/133663 A1 | 9/2013 |
| WO | 2016/163723 A1 | 10/2016 |
| WO | 2017/052335 A1 | 3/2017 |
| WO | 2017/126922 A1 | 7/2017 |

OTHER PUBLICATIONS

Ericsson, R2-1802343, "TP to TS 38.300 on paging" 3GPP TSG RAN WG2 #101, Athens, Greece, Feb. 26-Mar. 2, 2018.
Korean Office Action dated Jan. 29, 2022, issued in Korean Application No. 10-2018-0053748.

* cited by examiner

METHOD AND APPARATUS FOR SUPPORTING PAGING IN NEXT GENERATION MOBILE COMMUNICATION SYSTEM

TECHNICAL FIELD

The disclosure relates to a method and apparatus for sending a paging message to a terminal by a network in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In the next-generation mobile communication system, mobile phones, NB-IoT devices, sensors, as well as more devices can establish a connection to a network. Therefore, in the next-generation mobile communication system, in order to manage a number of wireless communication devices as described above, it is necessary to introduce a new identity having a larger space and to allocate different identities to manage the wireless communication devices. However, when a new identity having a larger space is introduced as described above, it is necessary to support a method in which wireless communication devices assigned the new identity and wireless communication devices assigned a general identity are distinguished from each other to access a network.

In addition, in order for the network (5G core network (5G CN) or LTE core network (EPC)) to transmit downlink data to the terminal, there is a need for an efficient method of establishing a network connection by sending a paging message to the wireless communication devices assigned the identities.

DETAILED DESCRIPTION OF INVENTION

Technical Problem

A purpose of the disclosure is to propose a method of operating a terminal in the case that the terminal receives message 4 (RRC message, for example, RRC connection reconfiguration or RRC connection resume or RRC connection release including new parameters/reconfiguration related to inactive) through signal radio bearer (SRB) 0 for a predetermined reason in response to this from the base station, when a terminal in a radio resource control (RRC) inactivation mode transmits message 3 to the base station when radio access node-based notification area update (RANU) is triggered.

In addition, another purpose of the disclosure is to propose an efficient structure of the paging message when a paging message is sent to the terminal so that the terminal establishes a network connection in the case that downlink data occurs in a network (5G CN or EPC or base station)

Solution to Problem

A method of a terminal in a wireless communication system according to an embodiment of the disclosure to solve the above problems may include: receiving a paging message from a base station; identifying paging identification information in one paging record of a paging record list included in the paging message; determining an entity to which the paging message is to be transmitted, based on the identified paging identification information; and transmitting a message for radio resource control (RRC) connection to the determined entity, in response to the paging message.

In addition, a method of a base station in a wireless communication system according to an embodiment of the disclosure may include: transmitting a paging message to a terminal; receiving a message for radio resource control (RRC) connection from the terminal, in response to the transmission of the paging message; and determining an entity related to the message for RRC connection, wherein the entity may be determined based on the paging identification information identified by the terminal in one paging record of a paging record list included in the paging message.

In addition, a terminal in a wireless communication system according to an embodiment of the disclosure may include a transceiver and a controller configured to: control the transceiver to receive a paging message from a base station; identify paging identification information in one paging record of a paging record list included in the paging message; determine an entity to which the paging message is to be transmitted, based on the identified paging identification information; and control the transceiver to transmit a message for radio resource control (RRC) connection to the determined entity, in response to the paging message.

In addition, a base station in a wireless communication system according to an embodiment of the disclosure may include a transceiver, and a controller configured to: transmit a paging message to a terminal; control the transceiver to receive a message for radio resource control (RRC) connection from the terminal, in response to the transmission of the paging message; and determine an entity related to the message for RRC connection, wherein the entity may be determined based on the paging identification information identified by the terminal in one paging record of a paging record list included in the paging message.

Advantageous Effects of Invention

According to an embodiment of the disclosure, by allowing the terminal in the inactive mode to efficiently resume the RRC state, there are effects that the base station can service the terminal with less signaling overhead, and the terminal can transmit and receive messages with the base station while consuming less energy. In addition, according to the disclosure, there is an advantage of solving an unnecessary RRC message exchange procedure problem by proposing an operation of a terminal when a message 4 (RRC message, for example, RRC connection reconfiguration or RRC connection resume or RRC connection release including new parameters/reconfiguration related to inactive) is received through SRB0 for a predetermined reason in response to this from a base station, when RNAU is triggered and the terminal in a RRC inactivation mode transmits message 3 to the base station.

Another embodiment of the disclosure proposes an efficient structure of a paging message of the RRC message when a base station connected to the 5G core network (5G core-network (CN)) and the LTE core network (evolved packet core (EPC)) receives a paging message received from the 5G core network or the paging message received from the LTE core network and transmits a paging message to the terminal as an RRC message. Therefore, there is an effect of allowing terminals registered in the 5G core network and terminals registered in the LTE core network to receive the paging message and connect to the network.

BRIEF DESCRIPTION OF DRAWINGS

FIG. 2I is a diagram illustrating a structure of a terminal to which an embodiment of the disclosure can be applied.

MODE FOR THE INVENTION

First Embodiment

Figure 1A:
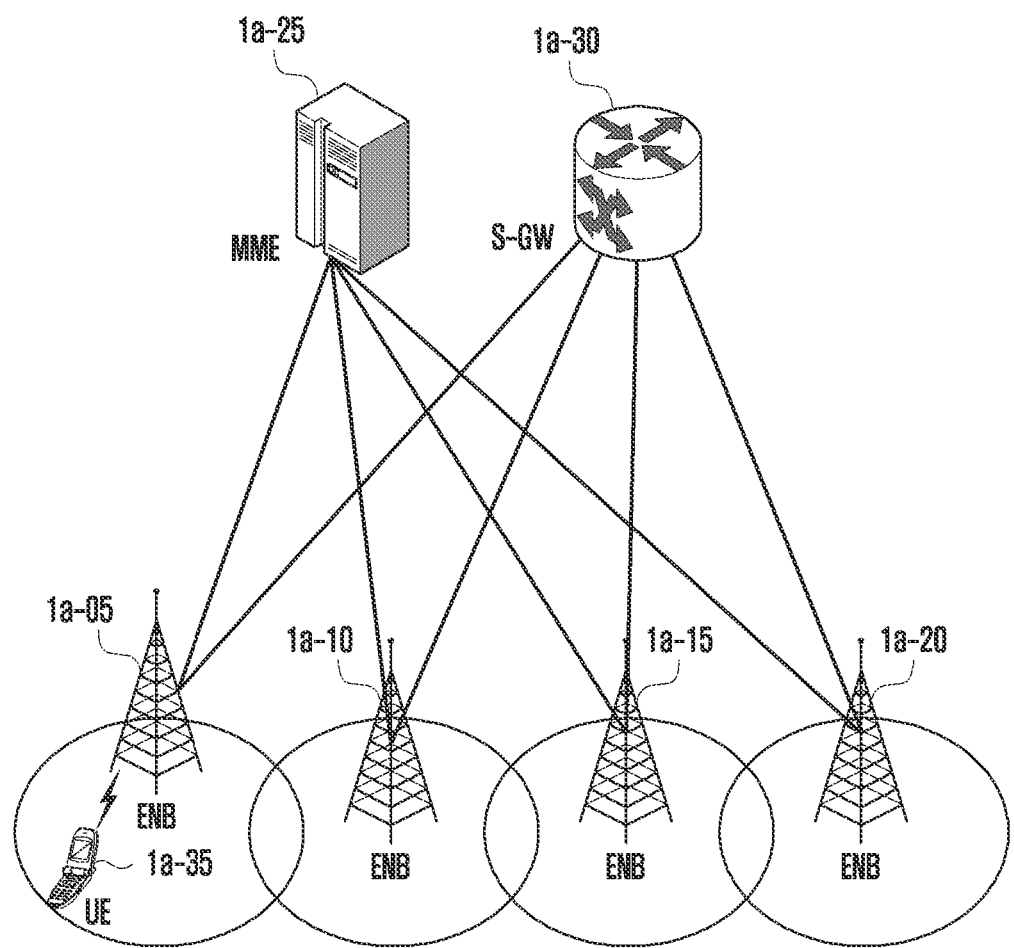
FIG. 1A is a diagram illustrating a structure of an LTE system to which the disclosure can be applied.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known relevant functions or configurations will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB".

The disclosure relates to a method and an apparatus for resuming an RRC state when an RRC inactivation mode terminal in a next-generation mobile communication system triggers a RAN-based notification area update (RNAU).

In the next-generation mobile communication system, it is necessary to define a new operation method of the terminal in the RRC inactivation mode in order to reduce power consumption of the terminal and to achieve efficient resource management. Therefore, in the disclosure, there is proposed a method of transmitting an RRC connection resume request (RRCConnectionResumeRequest) message to a base station by configuring different resume causes (resumeCause) when the RNAU is triggered because periodic PNAU timer/RAN periodic notification timer (periodic RNAU timer/RAN periodic notification timer) expires in the RNA to which the terminal in the RRC inactivation mode currently belongs, and when RNAU is triggered by deviating from the current RNA.

Accordingly, the base station efficiently selects a signaling radio bearer (SRB) according to the resumeCause of the terminal and sends an RRC message to the terminal so that the terminal in the inactive mode can efficiently resume the RRC state.

In addition, the disclosure proposes a method for sending an RRC message to the terminal by driving the periodic RNAU timer/RAN periodic notification timer configured by the base station to the terminal, implicitly identifying the resumeCause of the terminal by the base station, and selecting an SRB accordingly, when the terminal in the RRC inactivation mode transmits message 3 to the base station using the same resumeCause without distinguishing between triggering RNAU in the above two cases.

The disclosure proposes a method of transmitting an RRCConnectionResumeRequest message to a base station by configuring different resumeCause, respectively, in the next-generation mobile communication system, when the periodic RNAU timer/RAN periodic notification timer expires in the RNA to which the terminal in the RRC inactivation mode currently belongs and RNAU is triggered, and when RNAU is triggered by deviating from the current RNA.

The disclosure proposes a method in which the base station selects the SRB based on the resumeCause configuration proposed above and sends an RRC message (e.g., RRC Connection Reject or RRC Connection Resume or RRC Connection Release including new parameters/reconfiguration related to inactive) to the terminal.

FIG. 1A is a diagram illustrating a structure of an LTE system to which the disclosure can be applied.

Referring to FIG. 1A, as illustrated, the radio access network of the LTE system includes next-generation base stations (evolved node Bs, hereinafter ENBs, Node Bs or base stations) 1a-05, 1a-10, 1a-15, 1a-20, a mobility management entity (MME) 1a-25, and a serving-gateway (S-GW) 1a-30. A user equipment (hereinafter, referred to as "UE" or "terminal") 1a-35 accesses an external network through ENBs 1a-05 to 1a-20 and S-GW 1a-30.

In FIG. 1A, the ENBs 1a-05 to 1a-20 correspond to the existing node B of the UMTS system. The ENBs are connected to the UEs 1a-35 through a radio channel and perform a more complex role than the existing Node B. In the LTE system, all user traffic including real-time services such as voice over IP (VoIP) through the Internet protocol are serviced through a shared channel, so a device for scheduling by collecting state information such as buffer status, available transmission power status, and channel status of UEs is required, and ENBs 1a-05 to 1a-20 are in charge thereof.

One ENB typically controls multiple cells. For example, in order to implement a transmission rate of 100 Mbps, the LTE system uses an orthogonal frequency division multiplexing (OFDM) as a radio access technology in a 20 MHz bandwidth, for example. In addition, an adaptive modulation and coding method (hereinafter, referred to as "AMC") is applied to determine a modulation scheme and a channel coding rate according to the channel state of the terminal. The S-GW 1a-30 is a device that provides a data bearer, and creates or removes a data bearer under the control of the MME 1a-25. The MME is a device responsible for various control functions as well as mobility management functions for a terminal, and is connected to a number of base stations.

Figure 1B:
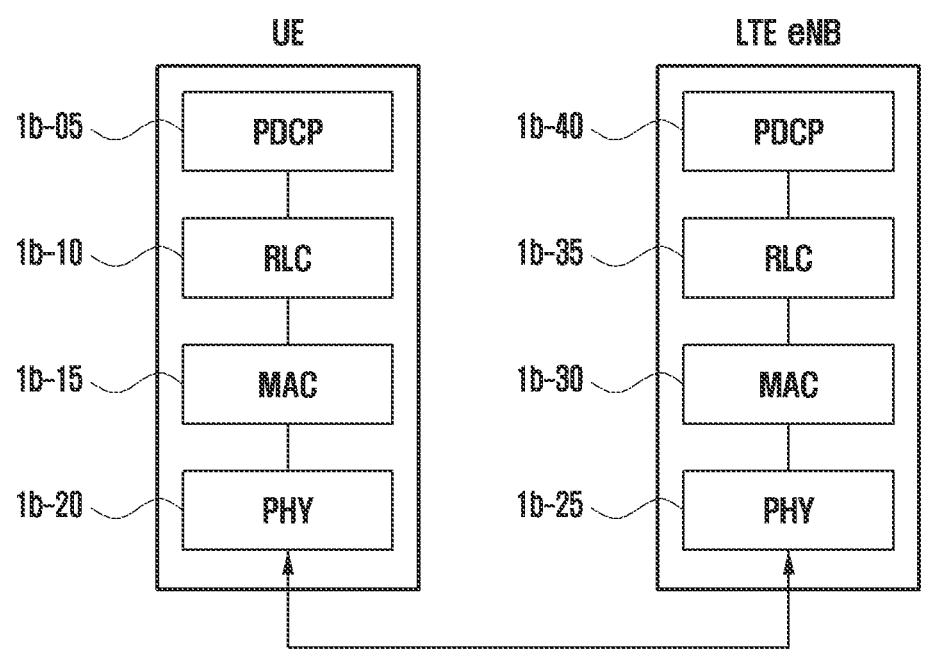
FIG. 1B is a diagram illustrating a radio protocol structure in an LTE system to which the disclosure can be applied.

FIG. 1B is a diagram illustrating a radio protocol structure in an LTE system to which the disclosure can be applied.

Referring to FIG. 1B, the radio protocol of the LTE system includes a packet data convergence protocol (PDCP) 1b-05, 1b-40, radio link control (RLC) 1b-10, 1b-35), and medium access control (MAC) 1b-15, 1b-30, in the terminal and ENB, respectively. The packet data convergence protocols (PDCP) 1b-05, 1b-40 are in charge of operations such as IP header compression/restore. The main functions of the PDCP are summarized as follows.

Header compression and decompression: ROHC only)
    Transfer of user data
    In-sequence delivery of upper layer PDUs at PDCP re-establishment procedure for RLC AM
    For split bearers in DC (only support for RLC AM): PDCP PDU routing for transmission and PDCP PDU reordering for reception
    Duplicate detection of lower layer SDUs at PDCP re-establishment procedure for RLC AM
    Retransmission of PDCP SDUs at handover and, for split bearers in DC, of PDCP PDUs at PDCP data-recovery procedure, for RLC AM
    Ciphering and deciphering
    Timer-based SDU discard in uplink The radio link controls (hereinafter, referred to as "RLC") 1b-10, 1b-35 perform ARQ operation by reconfiguring a PDCP packet data unit (PDU) to an appropriate size. The main functions of RLC are summarized as follows.

Transfer of upper layer PDUs
    Error Correction through ARQ (only for AM data transfer)
    Concatenation, segmentation, and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MACs 1b-15 and 1b-30 are connected to several RLC layer devices configured in one terminal, and perform an operation of multiplexing RLC PDUs to MAC PDUs and demultiplexing RLC PDUs from MAC PDUs. The main functions of MAC are summarized as follows.

Mapping between logical channels and transport channels)
    Multiplexing/demultiplexing of MAC SDUs belonging to one or different logical channels into/from transport blocks (TB) delivered to/from the physical layer on transport channels
    Scheduling information reporting
    Error correction through HARQ
    Priority handling between logical channels of one UE
    Priority handling between UEs by means of dynamic scheduling
    BMS service identification
    Transport format selection
    Padding The physical layers 1b-20, 1b-25 channel-code and modulate upper layer data, convert the same into OFDM symbols, and transmit the same to the radio channel, or demodulate OFDM symbols received through the radio channel, decode the channel, and deliver the same to the upper layer.

Figure 1C:
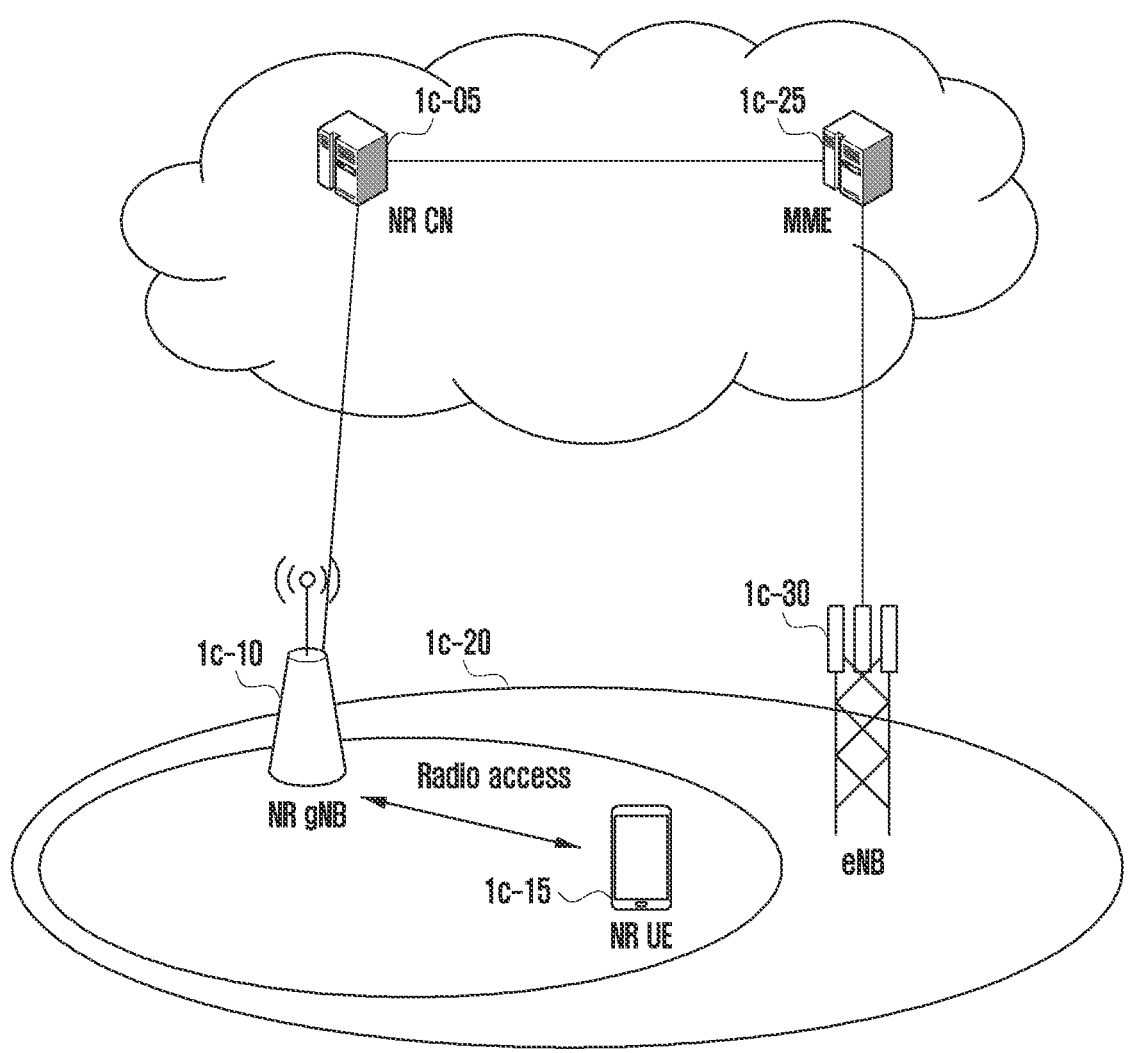
FIG. 1C is a diagram illustrating a structure of a next-generation mobile communication system to which the disclosure can be applied.

FIG. 1C is a diagram illustrating a structure of a next-generation mobile communication system to which the disclosure can be applied.

Referring to FIG. 1C, as illustrated, the radio access network of the next-generation mobile communication system (hereinafter NR or 5G) includes a next-generation base station (new radio node B, hereinafter NR gNB or NR base station) 1c-10 and a new radio core network (NR CN) 1c-05. The user terminal (new radio user equipment, hereinafter NR UE or terminal) 1c-15 accesses the external network through the NR gNB 1c-10 and NR CN 1c-05.

In FIG. 1C, the NR gNB 1c-10 corresponds to an Evolved Node B (eNB) of an existing LTE system. The NR gNB is connected to the NR UE 1c-15 through a radio channel and can provide a service superior to that of the existing Node B. In the next-generation mobile communication system, since all user traffic is serviced through a shared channel, there is a need for a device for scheduling by collecting state information such as buffer status, available transmission power status, and channel status of UEs, and the NR NB 1c-10 is in charge thereof. One NR gNB typically controls multiple cells.

In order to implement ultra-high-speed data transmission compared to the current LTE, it may have more than the existing maximum bandwidth, and a beamforming technology may be additionally grafted by using orthogonal frequency division multiplexing (OFDM) as a wireless access technology. In addition, an adaptive modulation and coding method (hereinafter referred to as "AMC") is applied to determine a modulation scheme and a channel coding rate according to a channel state of the terminal. The NR CN 1c-05 performs functions such as mobility support, bearer configuration, and QoS configuration. The NR CN is a device responsible for various control functions as well as mobility management functions for a terminal, and is connected to a plurality of base stations. In addition, the next-generation mobile communication system can be linked with the existing LTE system, and the NR CN is connected to the MME (1c-25) through a network interface. The MME is connected to the existing eNB 1c-30.

Figure 1D:
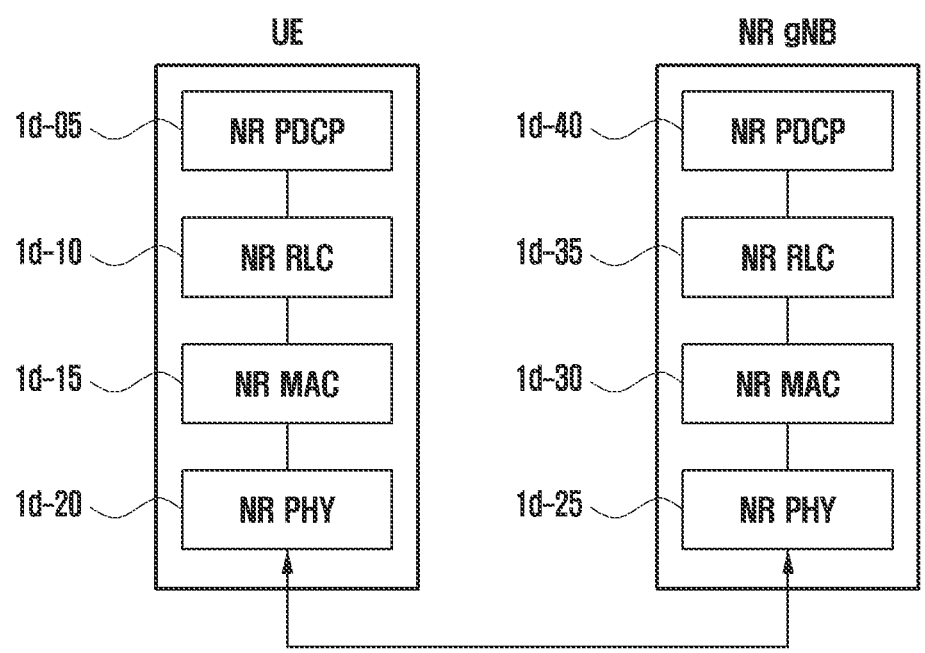
FIG. 1D is a diagram illustrating a radio protocol structure of a next-generation mobile communication system to which the disclosure can be applied.

FIG. 1D is a diagram illustrating a radio protocol structure of a next-generation mobile communication system to which the disclosure can be applied.

Referring to FIG. 1D, the radio protocol of the next-generation mobile communication system includes an NR PDCP 1d-05, 1d-40, an NR RLC 1d-10, 1d-35, and an NR MAC 1d-15, 1d-30, respectively in the terminal and the NR base station. The main functions of NR PDCP 1d-05, 1d-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink In the above, the reordering function of the NR PDCP device refers to a function of rearranging the PDCP PDUs received from the lower layer in order based on the PDCP sequence number (SN), and may include a function of transferring data to the upper layer in the rearranged order, may include a function of directly transferring without considering the order, may include a function of recording lost PDCP PDUs by rearranging the order, may include a function of reporting the status of lost PDCP PDUs to the transmitter, or may include a function of requesting retransmission of lost PDCP PDUs.

The main functions of the NR RLCs 1d-10, 1d-35 may include some of the following functions.

Transfer of upper layer PDUs
    In-sequence delivery of upper layer PDUs
    Out-of-sequence delivery of upper layer PDUs
    Error Correction through ARQ Concatenation, segmentation, and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery function of the NR RLC device refers to a function of sequentially delivering RLC SDUs received from a lower layer to an upper layer, and may include a function of reassembling and transmitting the RLC SDU when one RLC SDU is originally divided into multiple RLC SDUs and received, may include a function of rearranging the received RLC PDUs based on RLC sequence number (SN) or PDCP sequence number (SN), may include a function of reordering the order to record the lost RLC PDUs, may include a function of reporting the status of the lost RLC PDUs to the transmitting side, may include a function of requesting retransmission of lost RLC PDUs, may include a function of delivering only RLC SDUs before the lost RLC SDU to the upper layer in order when there is a lost RLC SDU, may include a function of sequentially delivering all RLC SDUs received before the timer starts to a higher layer when a predetermined timer has expired even if there is a lost RLC SDU, or may include a function of delivering all RLC SDUs received so far to an upper layer in order when a predetermined timer expires even if there is a lost RLC SDU.

In addition, the RLC PDUs may be processed in the order in which they are received (regardless of the order of serial number and sequence number, in the order of arrival) and delivered to the PDCP device regardless of the order (out-of-sequence delivery), and in the case of a segment, segments stored in a buffer or to be received in the future may be received, reconstructed into a complete RLC PDU, processed, and delivered to the PDCP device. The NR RLC layer may not include a concatenation function, and the function may be performed in the NR MAC layer or may be replaced with a multiplexing function of the NR MAC layer.

In the above, out-of-sequence delivery of the NR RLC device refers to a function of directly delivering RLC SDUs received from a lower layer to an upper layer regardless of order, and when one RLC SDU is originally divided into several RLC SDUs and received, may include a function of reassembling and transmitting them, and may include a function of storing the RLC SN or PDCP SN of the received RLC PDUs, sorting the order, and recording the lost RLC PDUs.

The NR MACs 1*d*-15 and 1*d*-30 may be connected to several NR RLC layer devices configured in one terminal, and the main functions of the NR MAC may include some of the following functions.
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1*d*-20, 1*d*-25 channel-code and modulate upper layer data, convert the same into OFDM symbols, and transmit the same to the radio channel, or demodulate an OFDM symbol received through a radio channel, decode a channel, and transmit the demodulation to an upper layer.

Figure 1E:
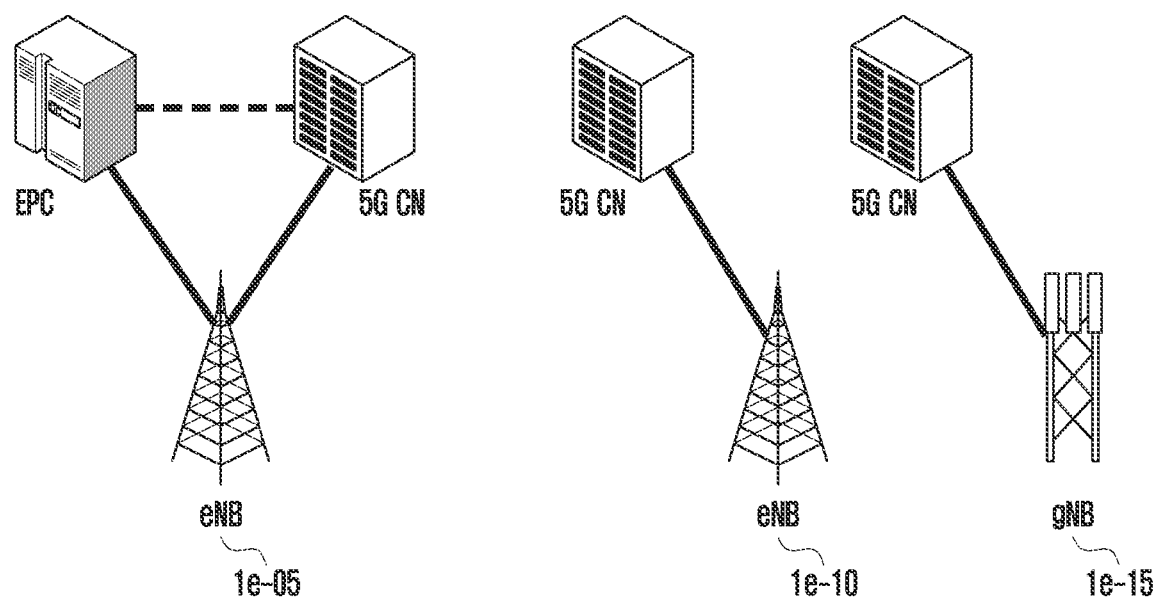
FIG. 1E is a diagram illustrating the connection relationship between an LTE base station (eNB), an NR base station (gNB), and a 5G core network (CN, NR core network) supported by a wireless communication system (LTE system, FIG. 1A) and a next-generation mobile communication system (NR system, FIG. 1C) in the disclosure.

FIG. 1E is a diagram illustrating the connection relationship between an LTE base station (eNB), an NR base station (gNB), and a 5G core network (CN, NR core network) supported by a wireless communication system (LTE system, FIG. 1A) and a next-generation mobile communication system (NR system, FIG. 1C) in the disclosure. The 5G CN is a network including an access management function (AMF). In FIG. 1*e*, as shown in 1*e*-05, a case where both the LTE base station (eNB) and the EPC and 5G CN are connected may be supported, as shown in 1*e*-10, a case where only an LTE base station (eNB) and 5G CN are connected may be supported, and as shown in 1*e*-15, a case where only an NR base station (gNB) and 5G CN are connected may be supported.

Accordingly, the disclosure proposes a method and an apparatus for resuming the RRC state of a terminal of an RRC inactivation mode capable of supporting all connection relationships between an LTE base station (eNB), an NR base station (gNB), and a 5G core network (CN, NR core network) described in FIG. 1E.

The disclosure proposes a method for transmitting message 3 (RRC message, for example, RRC Connection Resume Request) using different resumeCause to a base station when the periodic RNAU timer/RAN periodic notification timer expires in the RNA to which the terminal in RRC inactive mode currently belongs and RNAU is triggered, and when RNAU is triggered outside the current RNA. In addition, the disclosure proposes a method for the base station to send message 4 (RRC message, for example, RRC Connection Reject or RRC Connection Resume or RRC Connection Reconfiguration or RRC Connection Release) to the terminal, based on the resumeCause proposed above.

Therefore, the terminal in the inactivation mode efficiently resumes the RRC state or maintains the RRC inactivation mode, so that the base station can service while reducing the signaling overhead to the terminal, and the terminal can transmit and receive messages with the base station while consuming less energy.

The disclosure proposes to drive the periodic RNAU timer/RAN periodic notification timer configured by the base station to the terminal when the terminal in the RRC inactivation mode transmits message 3 to the base station by using the same resumeCause without distinguishing that RNAU is triggered in the above two cases.

In this case, the disclosure proposes a method for the base station to implicitly identify the resumeCause of the terminal and send message 4 to the terminal.

The disclosure proposes a method of operating a terminal in the case that the terminal in the RRC inactivation mode transmits message 3 to the base station when RNAU is triggered, the terminal receives message 4 (RRC message, for example, RRC Connection Reconfiguration or RRC Connection Resume or RRC Connection Release including new parameters/reconfiguration related to inactive) through SRB0 for a predetermined reason in response to this from the base station.

Figure 1F:
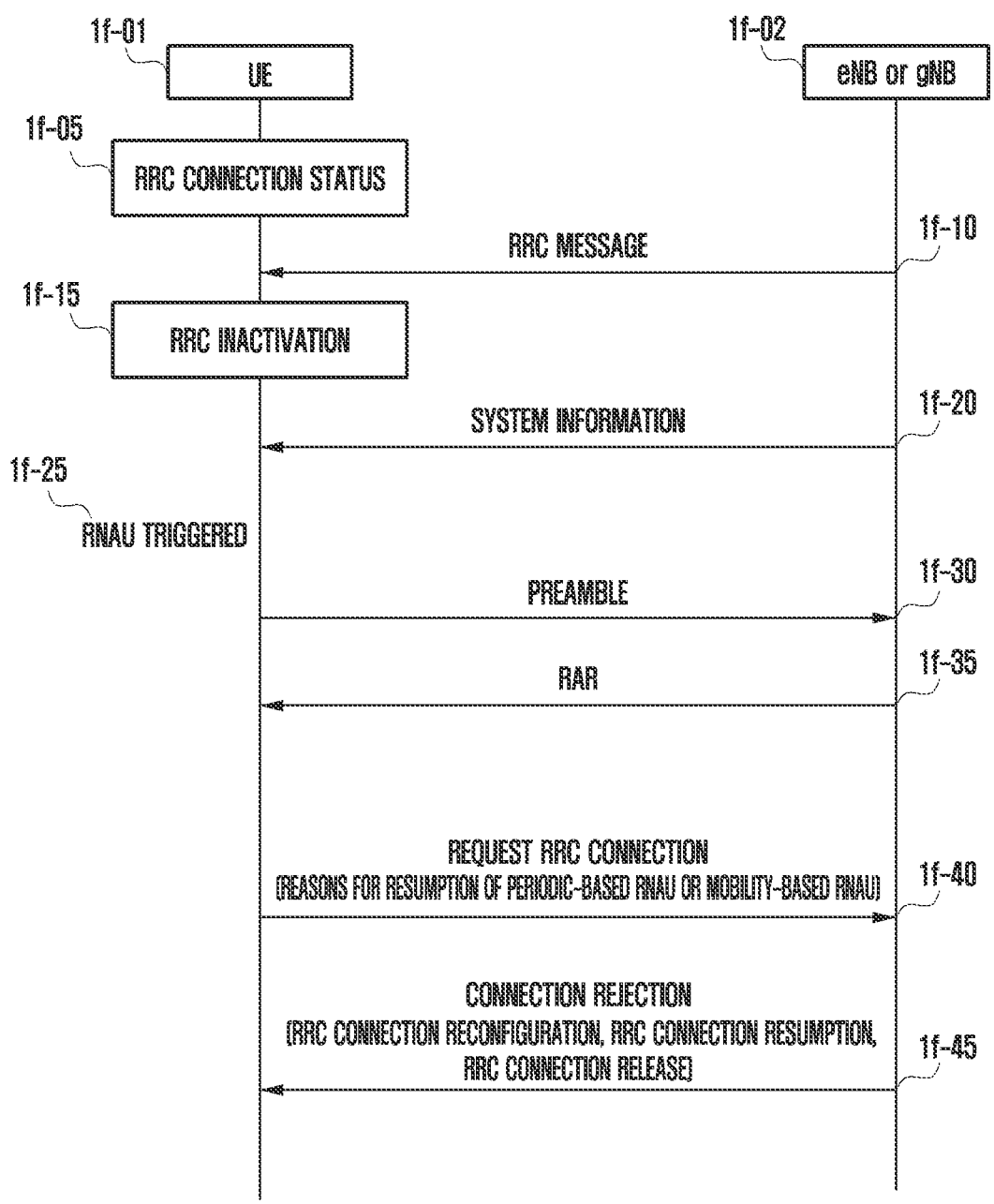
FIG. 1F is a diagram illustrating a procedure for resuming an RRC connection with a base station using different resumeCause when a periodic RNAU timer/RAN periodic notification timer expires in the RNA to which the terminal in the RRC inactivation mode currently belongs and RNAU is triggered, and when RNAU is triggered outside the current RNA, as embodiment 1-1 proposed by the disclosure.

FIG. 1F is a diagram illustrating an RRC connection resume procedure with a base station using different resumeCause when a periodic RNAU timer/RAN periodic notification timer expires in the RNA to which the terminal in RRC inactivation mode currently belongs and RNAU is triggered, and when RNAU is triggered outside the current RNA, as embodiment 1-1 proposed by the disclosure.

In FIG. 1F, if the terminal 1*f*-05 transmitting and receiving data in the RRC connected mode does not transmit or receive data for a predetermined reason or for a certain period of time, the base station 1*f*-02 may send an RRC message (e.g., RRC connection release or RRC connection suspend or RRC connection reconfiguration or a new RRC message (e.g., To Inactive)) to the terminal 1*f*-10 to switch the terminal to the RRC inactivation mode (1*f*-15).

That is, the network may indicate mode switching by transmitting an RRC message (1*f*-10) when transitioning the UE in the RRC connected mode to the RRC inactive mode. In the RRC message 1*f*-10, information about a frequency to perform frequency measurement in an RRC inactivation mode, a priority about a frequency, a timer value, and the like may be included. It may be more efficient for the network to configure the frequency measurement configuration information to the terminal as an RRC message rather than broadcasting the frequency measurement configuration information from the cell to the system information. Because the network can accurately know the UE capability of the RRC connected mode terminal, more suitable frequency measurement configuration information can be configured.

The RRC message 1*f*-10 may include the following information.

1. Information on the frequency corresponding to the measurement target or information on the frequency of each cell (because the frequency integration technology can support only a plurality of cells or frequencies belonging to one base station, it can be configured as information about cells or frequencies belonging to one base station), frequency band information or frequency identity (cell identity), measurement value to be measured (reference signal received power (RSRP), reference signal received quality (RSRQ), reference signal-signal to interference and noise ratio (RS-SINR)), measurement object, measurement ID, or report configuration ID.

2. Information of the area where frequency measurement is to be performed in RRC inactive mode (e.g., tracking area (TA) or a list of cells or RAN notification area (RNA) or default area information used when there is no area information) may also be indicated by a physical cell ID or a base station identity to indicate a region or frequency in which the UE should perform frequency measurement.

3. Security key (e.g., NCC) information to be used for resume

4. UE identity or UE context identity

5. RAN periodic notification timer or periodic RNAU timer

In the above, the terminal receiving the RRC message (1*f*-10) transitions to the RRC inactivation mode according to the instruction of the RRC message (1*f*-15). In the RRC inactivation mode, the terminal performs cell re-selection while moving, and when a suitable cell is found and a cell to be camped on is found, the terminal reads the system information (1*f*-20) of the cell.

The terminal in the RRC inactivation mode camps on a certain cell and may read information about a frequency to perform frequency measurement in an RRC idle mode or RRC inactive mode, priority about frequency, timer information (e.g., periodic RNAU timer), information on a region in which frequency measurement is to be performed, and the like from the system information of the cell (e.g., SIB5 in LTE system, SIB1 or SIB2, or SIB3 or SIB4 or SIB5 in next-generation mobile communication system). That is, some of the information or information included in the RRC message 1*f*-10 described above may be broadcast as system information.

In the RRC inactivation mode, the terminal performs a cell selection or a selection procedure based on the information configured in the read system information 1*f*-20 while moving. At this time, the terminal in the RRC inactivation mode performs an RRC connection resume process when RNAU is triggered in the following two cases (1*f*-25).

■ First case:
♦ When the periodic RNAU timer or RAN periodic notification timer expires in the state of the current RNA
■ Second case:
♦ Deviating from the current RNA When RNAU is triggered by the first case, the operations of the terminal and the base station in the RRC inactivation mode are as follows.

■ First operation:
♦ The terminal in an RRC inactivation mode performs an RRC connection resume process with the base station. The terminal in the RRC inactivation mode transmits a preamble for connection with the base station (1*f*-30), receives a random access response (RAR) from the base station (1*f*-35) to establish reverse transmission synchronization with the base station, and transmits message 3 (e.g., an RRCConnectionResumeRequest message) to the base station through SRB0 (1*f*-40). In the message, the identity of the terminal and the reason for establishing the connection (e.g., resumeCause of periodic-based RNAU) are stored. The base station transmits message 4 (e.g., RRC Connection Reject) to the terminal through SRB0 (1*f*-45). The terminal maintains the RRC inactivation mode while maintaining the previously configured values.

♦ When the terminal in the RRC inactivation mode fails the random access process, the terminal autonomously transitions to the RRC idle state without explicit instructions from the network.

When RNAU is triggered by the second case, the operations of the terminal and the base station in RRC inactivation mode are as follows.

■ Second operation:
♦ The terminal in the RRC inactivation mode performs an RRC connection resume process with the base station. The terminal in the RRC inactivation mode transmits a preamble for connection with the base station (1*f*-30), receives a random access response (RAR) from the base station (1*f*-35) to establish reverse transmission synchronization with the base station, and transmits message 3 (e.g., an RRCConnectionResumeRequest message) to the base station through SRB0 (1*f*-40). The message contains an identity of the terminal and a reason for establishing a connection (e.g., resumeCause of mobility-based RNAU). The base station transmits message 4 (e.g., RRC connection reconfiguration or RRC connection resume or RRC connection release including new parameters/reconfiguration related to inactive) to the UE through SRB1 (1*f*-45). The terminal maintains the RRC inactivation mode while applying the newly configured values.

♦ When the terminal in the RRC inactivation mode fails the RRC connection resume process with the base station or the random access process fails, the terminal autonomously transitions to the RRC idle state without explicit instructions from the network.

Figure 1G:
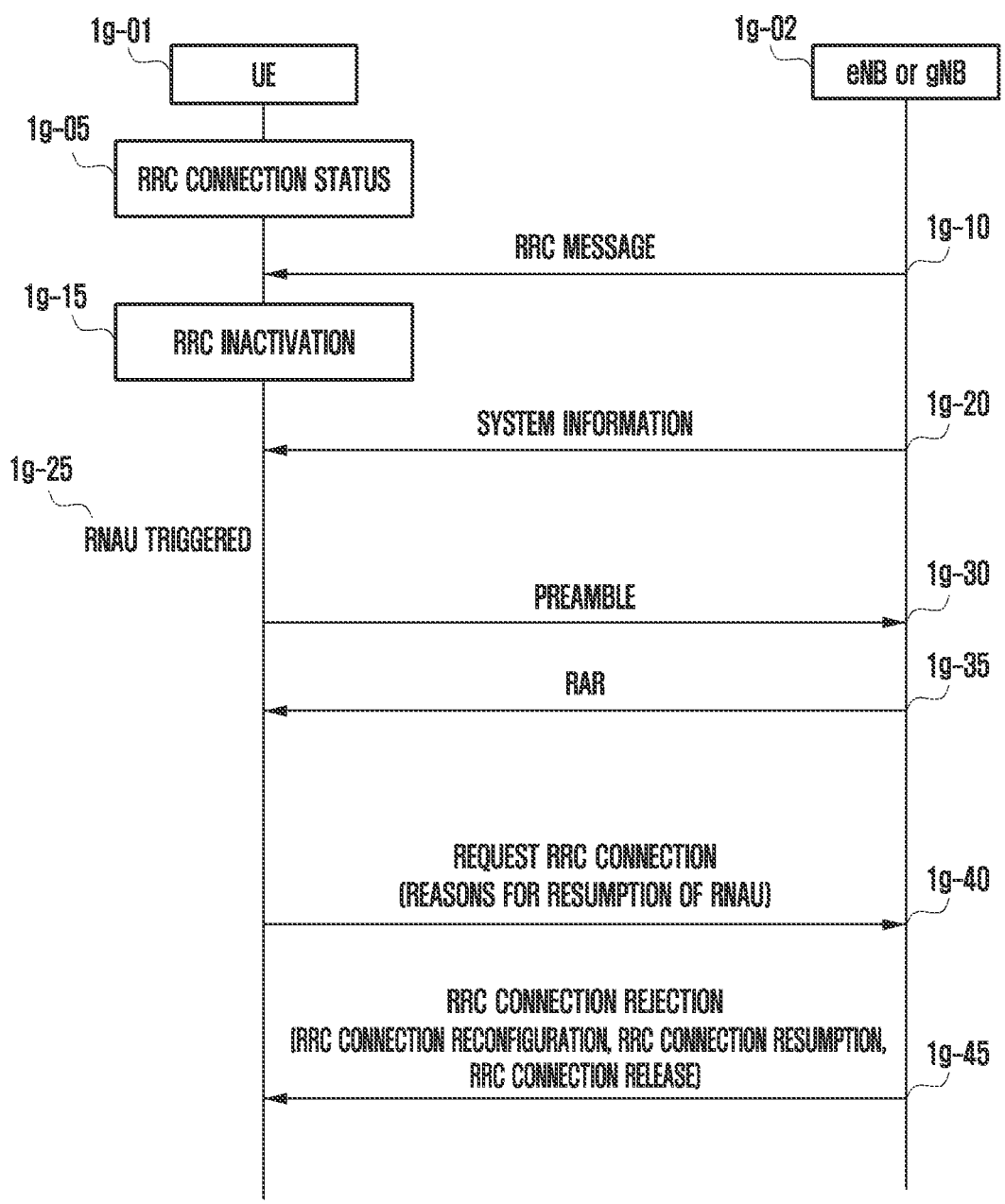
FIG. 1G is a diagram illustrating a procedure for resuming an RRC connection with a base station using the same resumeCause without distinguishing the case where the periodic RNAU timer/RAN periodic notification timer expires in the RNA to which the terminal in RRC inactivation mode currently belongs and the RNAU is triggered and the case where the RNAU is triggered outside the current RNA, as embodiment 1-2 proposed by the disclosure.

FIG. 1G is a diagram illustrating an RRC connection resume procedure with a base station using the same resumeCause without distinguishing between the case where the periodic RNAU timer/RAN periodic notification timer expires in the RNA to which the terminal in RRC inactivation mode currently belongs and the RNAU is triggered, and the case where the RNAU is triggered outside the current RNA, as example 1-2 proposed by the disclosure.

In FIG. 1G, when the terminal in the RRC connected mode transmitting and receiving data does not transmit or receive data for a certain reason or for a certain period of time (1g-05), the base station 1g-02 may send an RRC message (e.g., RRC connection release or RRC connection suspend or RRC connection reconfiguration or a new RRC message (e.g., To Inactive)) to the terminal (1g-10) and puts the terminal in the RRC inactivation mode (1g-15).

That is, the network may indicate mode switching by transmitting an RRC message (1f-10) when transitioning the UE in the RRC connected mode to the RRC inactive mode. The RRC message 1g-10 may include information on a frequency to perform frequency measurement in an RRC inactivation mode, a priority for a frequency, a timer value, and the like. It may be more efficient for the network to configure the frequency measurement configuration information to the terminal as an RRC message rather than broadcasting the frequency measurement configuration information from the cell to the system information. This is because the network can accurately determine the UE capability of the RRC connected mode terminal, so that more suitable frequency measurement configuration information can be configured.

The RRC message 1g-10 may include the following information.

1. Information about the frequency corresponding to the target to be measured or information about the frequency of each cell (because the frequency integration technology can support only a plurality of cells or frequencies belonging to one base station, it can be configured as information on cells or frequencies belonging to one base station), frequency band information, frequency identity (cell identity), measurement value to be measured (RSRP, RSRQ, RS-SINR), measurement object, measurement identity (measurement ID), or report configuration ID.

2. In the RRC inactivation mode, information on a region in which frequency measurement is to be performed (e.g., tracking area (TA), a list of cells, RAN notification area (RNA), or default area information used when there is no area information) may also be indicated by a physical cell ID, a base station identity to indicate a region, or frequency in which the UE should perform frequency measurement.

3. Security key (for example, NCC) information to be used for resume.

4. UE identity or UE context identity.

5. RAN periodic notification timer or periodic RNAU timer.

In the above, the terminal receiving the RRC message (1g-10) transitions to the RRC inactivation mode according to the instruction of the RRC message (1g-15). In the RRC inactivation mode, the terminal performs cell re-selection while moving, and when a suitable cell is found and a cell to be camped on is found, the terminal reads the system information (1g-20) of the cell.

The terminal camps on a cell in the RRC inactivation mode and may read information about a frequency to perform frequency measurement in an RRC idle mode or an RRC inactivation mode of the corresponding cell, priority about frequency, timer information (e.g. periodic RNAU timer), information on a region in which frequency measurement is to be performed, etc. from the system information (e.g., SIB5 in LTE system, SIB1 or SIB2, or SIB3 or SIB4 or SIB5 in next-generation mobile communication system). That is, some of the information or information included in the RRC message described above may be broadcast as system information (1g-10).

In the RRC inactivation mode, the terminal performs a cell reselection or a selection procedure, based on information configured in the read system information (1g-20) while moving. In this case, the terminal in the RRC inactivation mode performs an RRC connection resume process when RNAU is triggered in the following two cases (1g-25).

■ First case:
♦ When the periodic RNAU timer or RAN periodic notification timer expires in the state of the current RNA.
■ Second case:
♦ Deviating from the current RNA When RNAU is triggered by the first case, the operations of the terminal and the base station in the RRC inactivation mode are as follows.

■ First operation:
♦ The terminal in the RRC inactivation mode performs an RRC connection resume process with the base station. The terminal in the RRC inactivation mode transmits a preamble for connection with the base station (1g-30), receives a random access response (RAR) from the base station (1g-35) to establish reverse transmission synchronization with the base station, and transmits message 3 (e.g., an RRCConnectionResumeRequest message) to the base station through SRB0 (1g-40). The message contains an identity of the terminal and a reason for establishing a connection (e.g., resumeCause of RNAU). The base station that has received the message 3 implicitly identifies the periodic RNAU timer configured to the terminal, and when the base station identifies that the periodic RNAU timer has expired, transmits the message 4 (e.g., RRC connection reject) to the terminal through SRB0 (1g-45). The terminal maintains the RRC inactivation mode while applying the newly configured values.

♦ When the terminal in the RRC inactivation mode fails the random access process, the terminal autonomously transitions to the RRC idle state without explicit instructions from the network.

When RNAU is triggered by the second case, the operations of the terminal and the base station in RRC inactivation mode are as follows.

■ Second operation:
♦ The terminal in the RRC inactivation mode performs an RRC connection resume process with the base station. The terminal in the RRC inactivation mode transmits a preamble for connection with the base station (1g-30), receives a random access response (RAR) from the base station (1g-35) to establish reverse transmission synchronization with the base station, and transmits message 3 (e.g., an RRCConnectionResumeRequest message) to the base station through SRB0 (1g-40). The message contains an identity of the terminal and a reason for establishing a connection (e.g., resumeCause of RNAU). The base station that has received the message 3 implicitly identifies the periodic RNAU timer configured to the terminal, and when the base station identifies that the periodic RNAU timer has not expired, transmits the message 4 (e.g., RRC connection reconfiguration or RRC connection resume or RRC connection release that includes new parameters/reconfiguration related to inactive) to the terminal through SRB1 (1g-45). The terminal receiving message 4 through SRB1 maintains the RRC inactivation mode while applying the newly set values.

♦ When the terminal in the RRC inactivation mode fails the RRC connection resume process with the base station or the random access process, the terminal autonomously transitions to the RRC idle state without explicit instructions from the network.

Figure 1H:
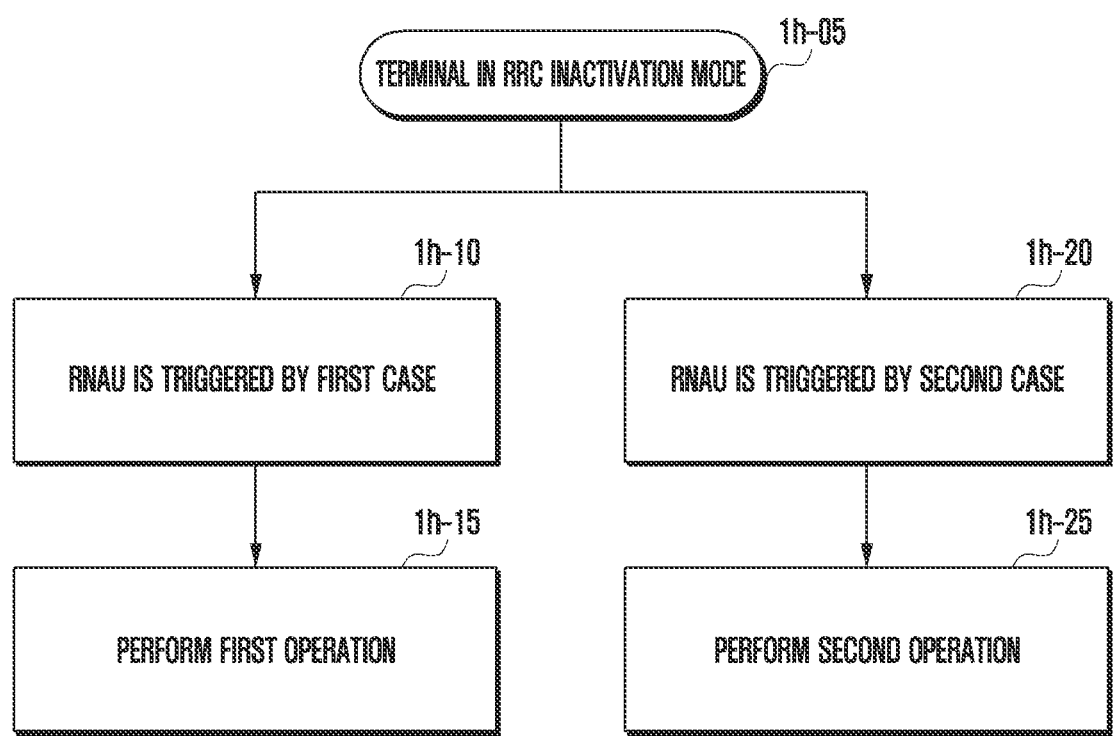
FIG. 1H is a diagram illustrating operations of a terminal and a base station in the RRC inactivation mode to which embodiment 1-1 and embodiment 1-2 of the disclosure can be applied.

FIG. 1H is a diagram illustrating the operations of a terminal and a base station in an RRC inactivation mode to which embodiment 1-1 and embodiment 1-2 of the disclosure can be applied.

When RNAU is triggered by the first case in step 1h-05 (1h-10), the terminal and the base station in the RRC inactivation mode perform the first operation (1h-15). When RNAU is triggered by the second case in step 1h-05 (1h-20), the terminal and the base station in the RRC inactivation mode perform the second operation (1h-25).

Figure 1I:
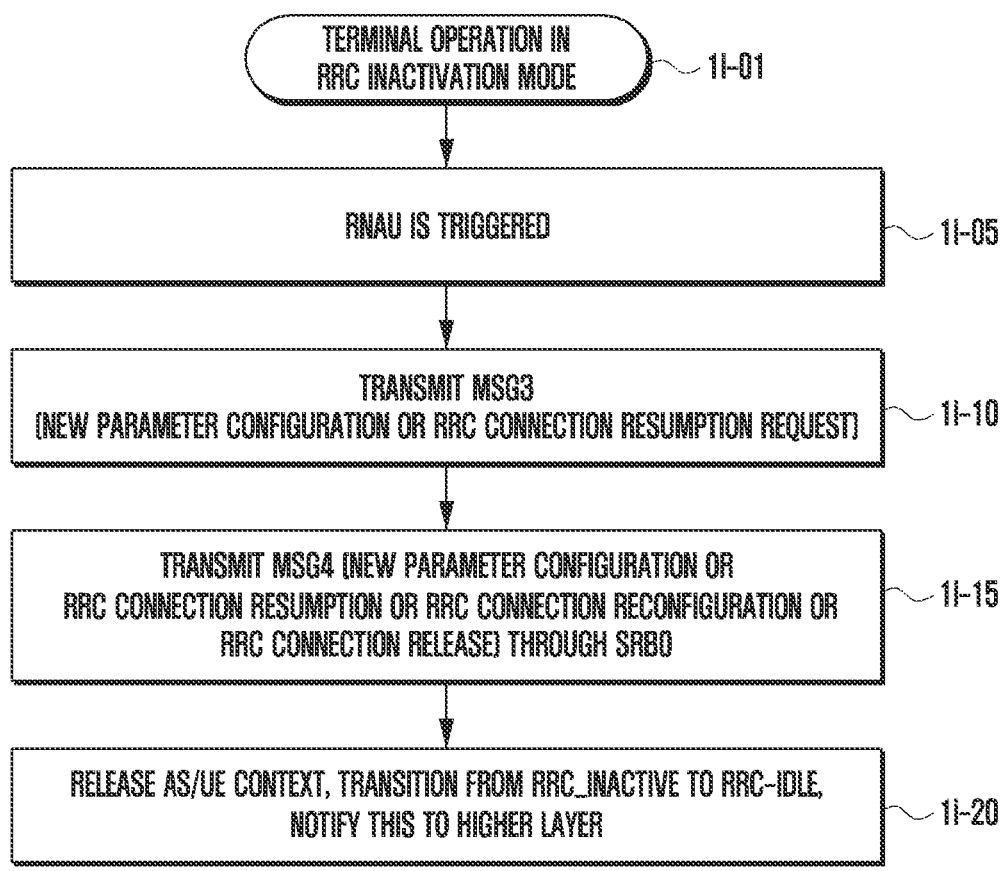
FIG. 1I is a diagram illustrating an operation of a terminal in the RRC inactivation mode when the terminal receives message 4 (e.g., RRC Connection Reconfiguration or RRC Connection Resume or RRC Connection Release including new parameters/reconfiguration related to inactive) from the base station through SRB0, when RNAU is triggered and RRC connection resume is performed, as an example of embodiment 1-3 proposed by the disclosure.

FIG. 1I is a diagram illustrating an operation of a terminal in the RRC inactivation mode when the terminal receives message 4 (e.g., RRC Connection Reconfiguration or RRC Connection Resume or RRC Connection Release including new parameters/reconfiguration related to inactive) from the base station through SRB0, when RNAU is triggered and RRC connection resume is performed, as an example of the embodiment 1-3 proposed by the disclosure.

When RNAU is triggered in step 1i-05, the terminal in the RRC inactivation mode transmits message 3 (e.g., RRCConnectionResumeRequest message) to the base station through SRB0 (1i-10). The message contains an identity of the terminal and a reason for establishing a connection (e.g., resumeCause RNAU). In this case, the resumeCause may be configured identically or differently.

When the terminal in the RRC inactivation mode transmitting message 3 through SRB0 receives message 4 (e.g., RRC Connection Reconfiguration or RRC Connection Resume or RRC Connection Release including new parameters/reconfiguration related to inactive) from the base station through SRB0 for a predetermined reason (1i-15) in step 1i-15, the terminal releases the AS/UE context, transitions to the RRC idle mode, and informs the UE NAS/upper layer of this fact (1i-20).

Figure 1J:
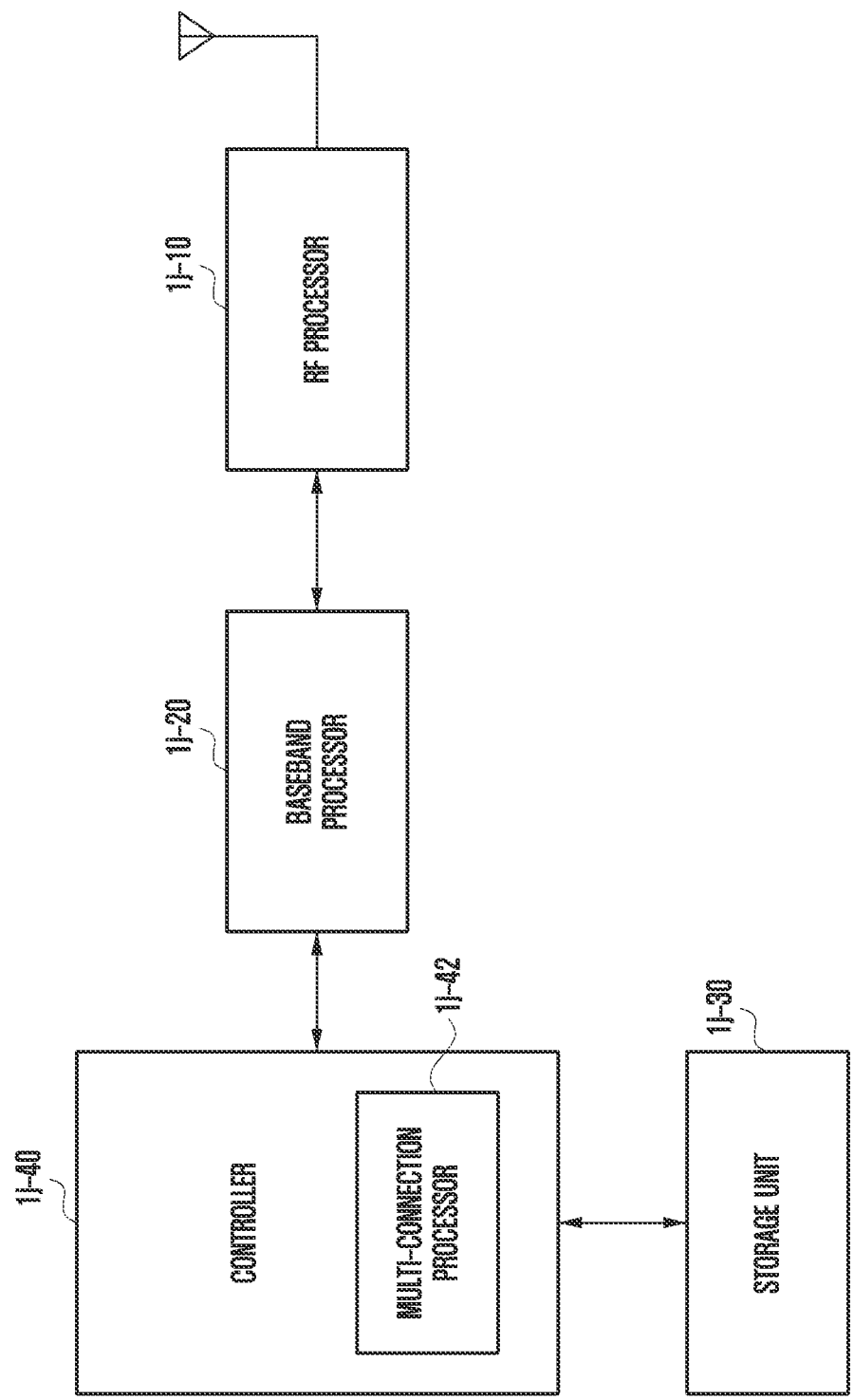
FIG. 1J is a block diagram illustrating an internal structure of a terminal to which the disclosure is applied.

FIG. 1J illustrates a structure of a terminal to which the disclosure is applied.

Referring to FIG. 1J, the terminal includes a radio frequency (RF) processor 1j-10, a baseband processor 1j-20, a storage unit 1j-30, and a controller 1j-40.

The RF processor 1j-10 performs functions for transmitting and receiving signals through a wireless channel, such as band conversion and amplification of signals. That is, the RF processor 1j-10 up-converts the baseband signal provided from the baseband processing unit 1j-20 to an RF band signal and transmits it through an antenna, and the RF band signal received through the antenna Is down-converted to a baseband signal. For example, the RF processor 1j-10 may include a transmission filter, a reception filter, an amplifier, a mixer, an oscillator, a digital to analog convertor (DAC), an analog to digital convertor (ADC), and the like.

In FIG. 1J, only one antenna is shown, but the terminal may include a plurality of antennas. In addition, the RF processor 1j-10 may include a plurality of RF chains. Further, the RF processor 1j-10 may perform beamforming. For the beamforming, the RF processor 1j-10 may adjust a phase and a magnitude of each of signals transmitted/received through a plurality of antennas or antenna elements.

In addition, the RF processor may perform MIMO, and may receive multiple layers when performing the MIMO operation. The RF processor 1j-10 may perform reception beam sweeping by appropriately configuring a plurality of antennas or antenna elements under control of the controller, or adjust the direction and beam width of the reception beam so that the reception beam cooperates with the transmission beam.

The baseband processor 1j-20 performs a function of converting between a baseband signal and a bit stream according to the physical layer standard of the system. For example, when transmitting data, the baseband processor 1j-20 generates complex symbols by encoding and modulating a transmission bit stream. In addition, when receiving data, the baseband processor 1j-20 restores a received bit stream through demodulation and decoding of the baseband signal provided from the RF processor 1i-10.

For example, according to the orthogonal frequency division multiplexing (OFDM) method, when transmitting data, the baseband processor 1j-20 generates complex symbols by encoding and modulating a transmission bit stream, maps the complex symbols to subcarriers, and then constructs OFDM symbols by performing an inverse fast Fourier transform (IFFT) operation and inserting a cyclic prefix (CP). In addition, when receiving data, the baseband processor 1j-20 divides the baseband signal provided from the RF processor 1j-10 in units of OFDM symbols, restores signals mapped to subcarriers through a fast Fourier transform (FFT) operation, and then restores the received bit stream through demodulation and decoding.

The baseband processor 1j-20 and the RF processor 1j-10 transmit and receive signals as described above. Accordingly, the baseband processor 1j-20 and the RF processor 1j-10 may be referred to as a transmitter, a receiver, a transceiver, or a communication unit. Furthermore, at least one of the baseband processor 1j-20 and the RF processor 1j-10 may include a plurality of communication modules to support a plurality of different wireless access technologies. In addition, at least one of the baseband processor 1j-20 and the RF processor 1j-10 may include different communication modules to process signals of different frequency bands. For example, the different radio access technologies may include an LTE network, an NR network, and the like. In addition, the different frequency bands may include a super high frequency (SHF) (e.g., 2.5 GHz, 5 Ghz) band, and a millimeter wave (e.g., 60 GHz) band.

The storage unit 1j-30 stores data such as a basic program, an application program, and configuration information for the operation of the terminal. The storage unit 1j-30 provides stored data according to the request of the controller 1j-40.

The controller 1j-40 controls overall operations of the terminal. For example, the controller 1j-40 transmits and receives signals through the baseband processor 1j-20 and the RF processor 1j-10. In addition, the controller 1j-40 writes and reads data in the storage unit 1j-30. To this end, the controller 1j-40 may include at least one processor. For example, the controller 1j-40 may include a communication processor (CP) that performs control for communication and an application processor (AP) that controls an upper layer such as an application program.

Figure 1K:
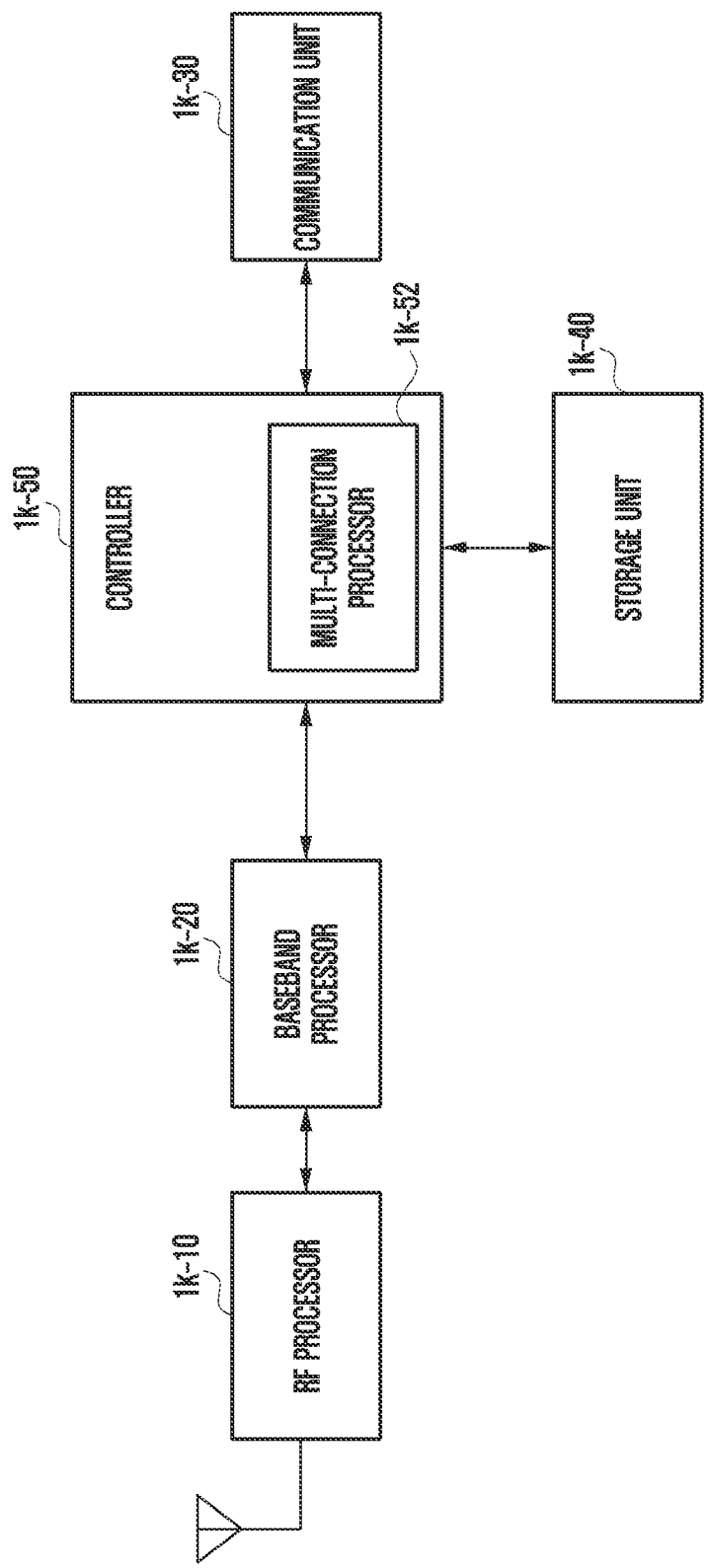
FIG. 1K is a block diagram illustrating a configuration of a base station according to the disclosure.

FIG. 1K illustrates a configuration of a main base station in a wireless communication system according to an embodiment of the disclosure.

As illustrated in FIG. 1K, the base station includes an RF processor 1k-10, a baseband processor 1k-20, a backhaul communication unit 1k-30, a storage unit 1k-40, and a controller 1k-50.

The RF processor 1k-10 performs a function for transmitting and receiving a signal through a wireless channel such as band conversion and amplification of a signal. That is, the RF processor 1k-10 up-converts the baseband signal provided from the baseband processor 1k-20 to an RF band signal, transmits the same through an antenna, and downconverts the RF band signal received through the antenna into a baseband signal. For example, the RF processor 1k-10 may include a transmission filter, a reception filter, an amplifier, a mixer, an oscillator, a DAC, an ADC, and the like.

In the drawing, only one antenna is shown, but the first access node may include a plurality of antennas. In addition, the RF processor 1k-10 may include a plurality of RF chains. Furthermore, the RF processor 1k-10 may perform beamforming. For the beamforming, the RF processor 1k-10 may adjust a phase and a magnitude of each of signals transmitted and received through a plurality of antennas or antenna elements. The RF processor may perform a downlink MIMO operation by transmitting one or more layers.

The baseband processor 1k-20 performs a function of converting between a baseband signal and a bit string according to the physical layer standard of the first wireless access technology. For example, when transmitting data, the baseband processor 1k-20 generates complex symbols by encoding and modulating a transmission bit stream. In addition, when receiving data, the baseband processor 1k-20 restores a received bit stream through demodulation and decoding of the baseband signal provided from the RF processor 1k-10. For example, in the case of the OFDM scheme, when transmitting data, the baseband processor 1k-20 generates complex symbols by encoding and modulating a transmission bit stream, maps the complex symbols to subcarriers, and then configures OFDM symbols through IFFT calculation and CP insertion.

In addition, when receiving data, the baseband processor 1k-20 divides the baseband signal provided from the RF processor 1k-10 in units of OFDM symbols, restored signals mapped to subcarriers through FFT operation, and then restores the received bit stream through demodulation and decoding. The baseband processor 1k-20 and the RF processor 1k-10 transmit and receive signals as described above. Accordingly, the baseband processor 1k-20 and the RF processor 1k-10 may be referred to as a transmitter, a receiver, a transceiver, a communication unit, or a wireless communication unit.

The communication unit 1k-30 provides an interface for performing communication with other nodes in the network.

The storage unit 1k-40 stores data such as a basic program, an application program, and configuration information for the operation of the main station. In particular, the storage unit 1k-40 may store information on bearers allocated to the connected terminal, measurement results reported from the connected terminal, and the like. In addition, the storage unit 1k-40 may store information that is a criterion for determining whether to provide multiple connections to the terminal or stop. In addition, the storage unit 1k-40 provides stored data according to the request of the controller 1k-50.

The controller 1k-50 controls overall operations of the main station. For example, the controller 1k-50 transmits and receives signals through the baseband processor 1k-20 and the RF processor 1k-10 or through the backhaul communication unit 1k-30. In addition, the controller 1k-50 writes and reads data in the storage unit 1k-40. To this end, the controller 1k-50 may include at least one processor.

Second Embodiment

Hereinafter, the operation principle of the disclosure will be described in detail with reference to the accompanying drawings. In the following description of the disclosure, when it is determined that a detailed description of a related known function or configuration may unnecessarily obscure the subject matter of the disclosure, a detailed description thereof will be omitted. In addition, terms to be described later are terms defined in consideration of functions in the disclosure, which may vary depending on the intention or custom of users or operators. Therefore, the definition should be made based on the contents throughout this specification.

In the following description of the disclosure, if it is determined that a detailed description of a related known function or configuration may unnecessarily obscure the subject matter of the disclosure, a detailed description thereof will be omitted. Hereinafter, exemplary embodiments of the disclosure will be described with reference to the accompanying drawings.

A term for identifying an access node, a term for network entities, a term for messages, a term for an interface between network objects, and a term for various identification information, and the like used in the following description, are illustrated for convenience of description. Therefore, the disclosure is not limited to the terms described below, and other terms referring to objects having an equivalent technical meaning may be used.

For convenience of description below, the disclosure uses terms and names defined in the 3rd generation partnership project long term evolution (3GPP LTE) standard. However, the disclosure is not limited by the terms and names, and can be applied equally to systems conforming to other standards. In the disclosure, the eNB may be used interchangeably with gNB for convenience of description. That is, a base station described as an eNB may represent a gNB. In addition, the term terminal may refer to mobile phones, NB-IoT devices, sensors as well as other wireless communication devices.

The disclosure proposes an efficient structure of the paging message when downlink data occurs in the network (5G CN or EPC or base station), when sending a paging message to the terminal to allow the terminal to establish a network connection.

Figure 2A:
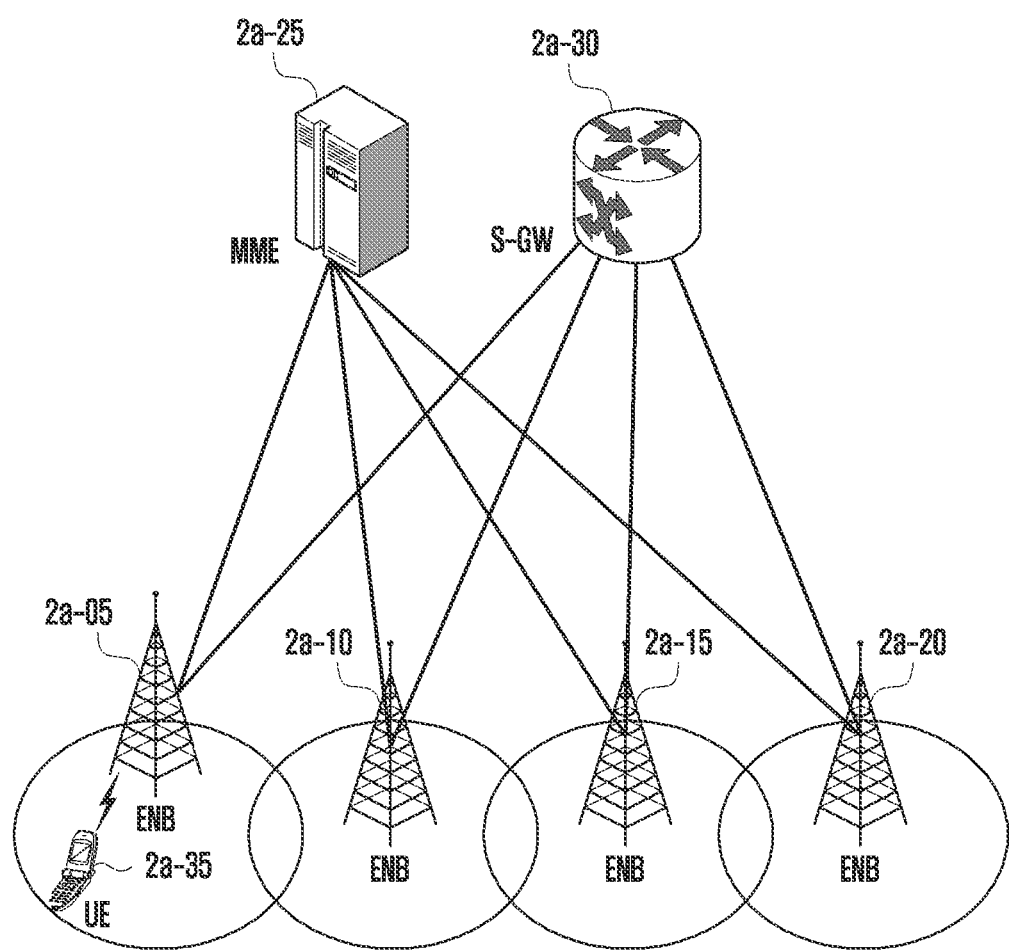
FIG. 2A is a diagram illustrating a structure of an LTE system to which the disclosure can be applied.

FIG. 2A is a diagram illustrating a structure of an LTE system to which the disclosure can be applied.

Referring to FIG. 2A, as shown, the radio access network of the LTE system includes next-generation base stations (evolved node Bs, hereinafter ENBs, Node Bs or base stations) 2a-05, 2a-10, 2a-15, 2a-20, a mobility management entity (MME) 2a-25, and a serving-gateway (S-GW) 2a-30. A user equipment (hereinafter referred to as "UE" or "terminal") 2a-35 accesses an external network through ENBs 2a-05 to 2a-20 and S-GW 2a-30.

In FIG. 2A, the ENBs 2a-05 to 2a-20 correspond to an existing node B of a universal mobile telecommunication system (UMTS). The ENB is connected to the UEs 2a-35 through a radio channel and performs a more complex role than the existing Node B.

In the LTE system, since all user traffic, including real-time services such as VoIP (Voice over IP) through Internet Protocol, is serviced through a shared channel, a device for scheduling by collecting state information such as buffer status, available transmission power status, and channel status of UEs is required, and ENBs 2a-05 to 2a-20 are in charge thereof. One ENB typically controls multiple cells. For example, in order to implement a transmission rate of 100 Mbps, the LTE system uses an orthogonal frequency division multiplexing (OFDM) as a radio access technology in a 20 MHz bandwidth, for example.

In addition, an adaptive modulation and coding method (hereinafter referred to as "AMC") is applied to determine a modulation scheme and a channel coding rate according to a channel state of the terminal. The S-GW 2a-30 is a device that provides a data bearer, and creates or removes a data bearer under the control of the MME 2a-25. The MME is a device responsible for various control functions as well as mobility management functions for a terminal, and is connected to a plurality of base stations.

Figure 2B:
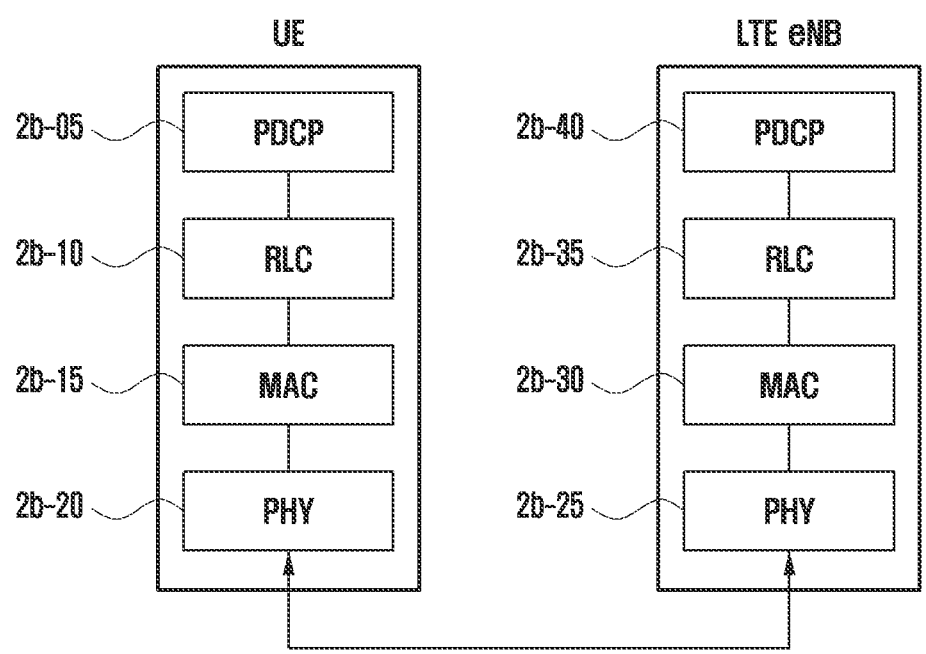
FIG. 2B is a diagram illustrating a radio protocol structure in an LTE system to which the disclosure can be applied.

FIG. 2B is a diagram illustrating a radio protocol structure in an LTE system to which the disclosure can be applied.

Referring to FIG. 2B, the radio protocol of the LTE system includes a packet data convergence protocol (PDCP) 2b-05, 2b-40, a radio link control (RLC) 2b-10, 2b-35), and a medium access control (MAC) 2b-15, 2b-30 in a terminal and an ENB, respectively.

The packet data convergence protocols (PDCPs) 2b-05, 2b-40 are in charge of operations such as IP header compression/restore. The main functions of PDCP are summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link control (hereinafter referred to as "RLC") 2b-10, 2b-35 performs an automatic repeat and request (ARQ) operation by reconfiguring a PDCP packet data unit (PDU) to an appropriate size. The main functions of RLC are summarized as follows.

Transfer of upper layer PDUs
Error Correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 2b-15 and 2b-30 are connected to several RLC layer devices configured in one UE, and perform an operation of multiplexing RLC PDUs to MAC PDUs and demultiplexing RLC PDUs from MAC PDUs. The main functions of MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The physical layer 2b-20, 2b-25 channel-codes and modulates upper layer data, converts the same into OFDM symbols, and transmits the same to the radio channel, or demodulates OFDM symbols received through the radio channel, decodes the channel, and delivers the same to the upper layer.

Figure 2C:
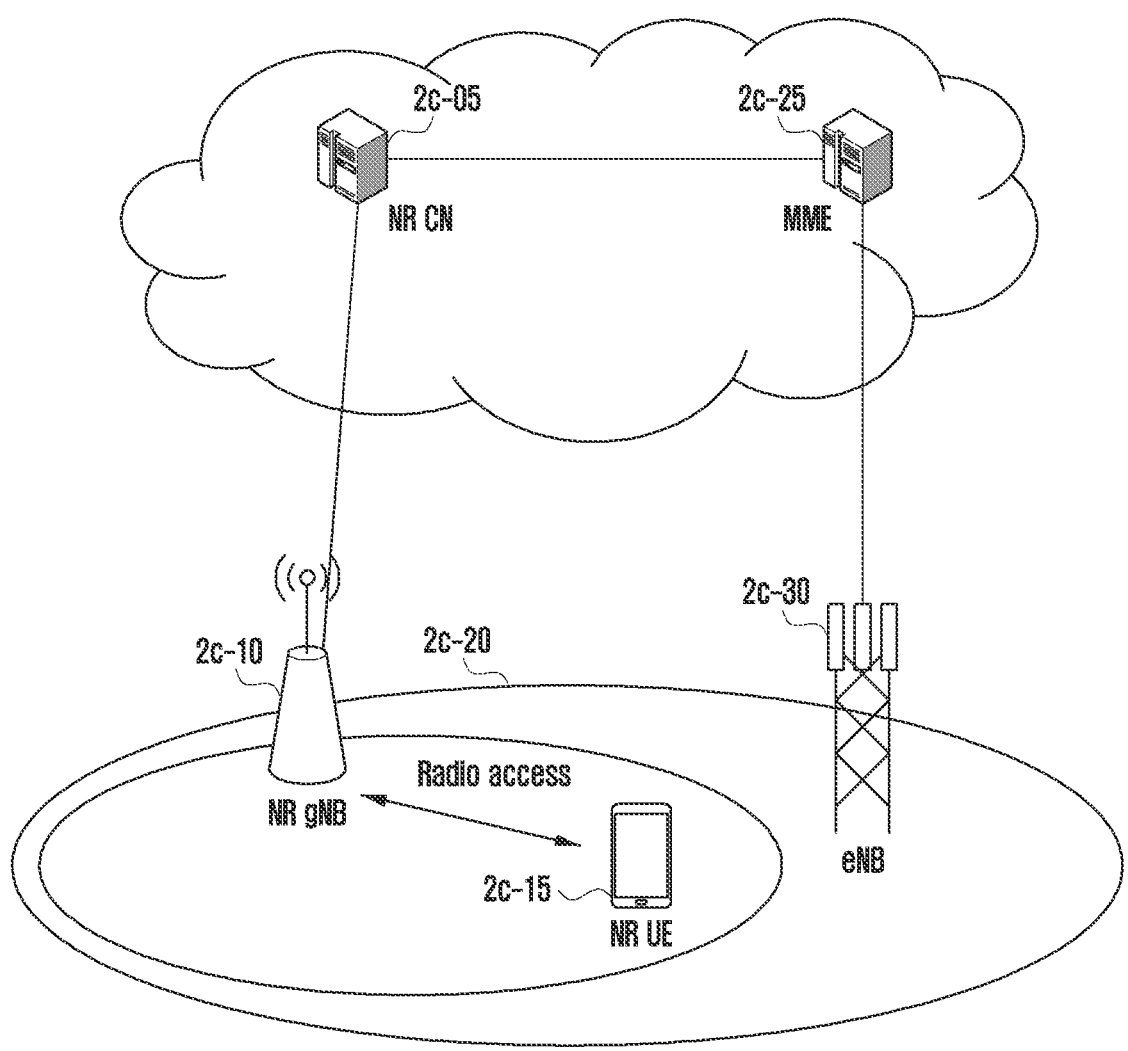
FIG. 2C is a diagram illustrating a structure of a next-generation mobile communication system to which the disclosure can be applied.

FIG. 2C is a diagram illustrating a structure of a next-generation mobile communication system to which the disclosure can be applied.

Referring to FIG. 2C, as shown, the radio access of the next-generation mobile communication system (hereinafter NR or 2G) includes a next-generation base station (new radio Node B, hereinafter NR gNB or NR base station) 2c-10 and a new radio core network (NR CN) 2c-05. A new radio user equipment (hereinafter NR UE or terminal) 2c-15 accesses an external network through the NR gNB 2c-10 and the NR CN 2c-05.

In FIG. 2C, the NR gNB 2c-10 corresponds to an evolved Node B (eNB) of an existing LTE system. The NR gNB is connected to the NR UE 2c-15 through a radio channel and can provide a service superior to that of the existing Node B.

In the next-generation mobile communication system, since all user traffic is serviced through a shared channel, a device for scheduling by collecting state information such as buffer status, available transmission power status, and channel status of UEs is required, and the NR NB 2c-10 is responsible therefor. One NR gNB typically controls multiple cells. In order to implement ultra-high-speed data transmission compared to the current LTE, the NR gNB may have more than the existing maximum bandwidth, and a beamforming technology may be additionally grafted by using orthogonal frequency division multiplexing (OFDM) as a wireless access technology.

In addition, an adaptive modulation and coding method (hereinafter referred to as "AMC") is applied to determine a modulation scheme and a channel coding rate according to a channel state of the terminal. The NR CN 2c-05 performs functions such as mobility support, bearer configuration, and quality of service (QoS) configuration. The NR CN is a device in charge of various control functions as well as a mobility management function for a terminal, and is connected to a plurality of base stations. In addition, the next-generation mobile communication system may also be interworked with the existing LTE system, and the NR CN is connected to the MME 2c-25 through a network interface. The MME is connected to the existing eNB 2c-30.

Figure 2D:
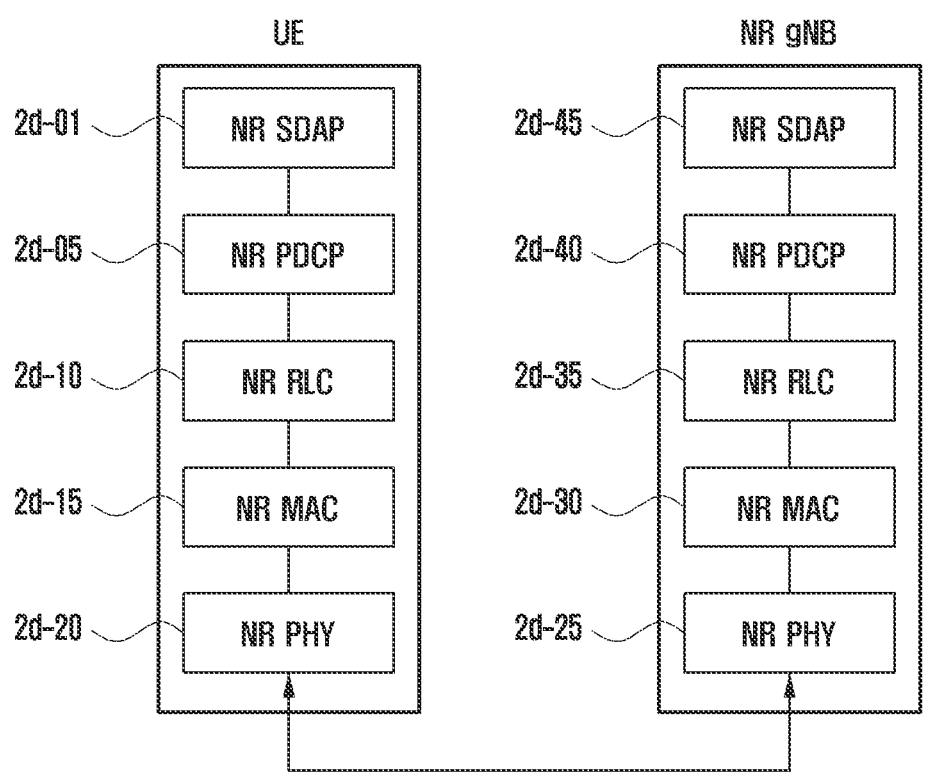
FIG. 2D is a diagram illustrating a radio protocol structure of a next-generation mobile communication system to which the disclosure can be applied.

FIG. 2D is a diagram illustrating a radio protocol structure of a next-generation mobile communication system to which the disclosure can be applied.

Referring to FIG. 2D, the radio protocol structure of a next-generation mobile communication system includes an NR SDAP 2d-01, 2d-45, an NR PDCP 2d-05, 2d-40, an NR RLC 2d-10, 2d-35, and an NR MAC 2d-15, 2d-30 in a terminal and an NR base station, respectively.

The main functions of the NR SDAPs 2d-01, 2d-45 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs For the SDAP layer device, the terminal may be configured with an RRC message to determine whether to use the header of the SDAP layer device for each PDCP layer device, for each bearer or for each logical channel, or whether to use the function of the SDAP layer device. When the SDAP header is configured, the terminal may indicate to update or reconfigure the mapping information for the uplink and downlink QoS flow and data bearer with the NAS QoS reflection configuration 1-bit indicator and the AS QoS reflection configuration 1-bit indicator in the SDAP header. The SDAP header may include QoS flow ID information indicating QoS. The QoS information may be used as data processing priority, scheduling information, etc. to support smooth service.

The main functions of NR PDCPs 2d-05, 2d-40 may include some of the following functions.
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above, the reordering function of the NR PDCP device refers to a function of reordering PDCP PDUs received from a lower layer in order based on a PDCP sequence number (SN), and may include a function of delivering data to an upper layer in a reordered order, may include a function of directly delivering data without considering the order, may include a function of reordering the order and recording the lost PDCP PDUs, may include a function of reporting the status of the lost PDCP PDUs to the transmitting side, or may include a function of requesting retransmission of lost PDCP PDUs.

The main functions of the NR RLCs 2d-10, 2d-35 may include some of the following functions.
Transfer of upper layer PDUs
In-sequence delivery of upper layer PDUs
Out-of-sequence delivery of upper layer PDUs
Error Correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery function of the NR RLC device refers to a function of sequentially delivering RLC SDUs received from a lower layer to an upper layer, and may include a function of reassembling and delivering when one RLC SDU is originally divided into multiple RLC SDUs and received, may include a function of rearranging received RLC PDUs, based on RLC sequence number (SN) or PDCP sequence number (SN), may include a function of recording RLC PDUs, may include a function of reporting a status of lost RLC PDUs to a transmitting side, may include a function of requesting retransmission of lost RLC PDUs, may include a function of sequentially delivering only RLC SDUs up to before the lost RLC SDU to a higher layer when there is a lost RLC SDU, may include a function of sequentially delivering all RLC SDUs received before the timer starts to an upper layer if a predetermined timer expires even if there is a lost RLC SDU, or may include a function of sequentially delivering all RLC SDUs received so far to an upper layer if a predetermined timer expires even if there is a lost RLC SDU.

In addition, the RLC PDUs may be processed in the order of reception (regardless of the order of serial number and sequence number, in the order of arrival) and delivered to the PDCP device regardless of the order (out-of-sequence delivery). In the case of a segment, segments stored in a buffer or to be received in the future may be received, reconstructed into a complete RLC PDU, processed, and delivered to the PDCP device. The NR RLC layer may not include a concatenation function, and the function may be performed in the NR MAC layer or may be replaced with a multiplexing function of the NR MAC layer.

In the above, out-of-sequence delivery of the NR RLC device refers to a function of directly delivering RLC SDUs received from a lower layer to an upper layer regardless of order, and may include a function of reassembling and delivering when one RLC SDU is originally divided into multiple RLC SDUs and received, and may include a function of storing the RLC SN or PDCP SN of the received RLC PDUs, sorting the order, and recording the lost RLC PDUs.

The NR MACs 2d-15 and 2d-30 may be connected to several NR RLC layer devices configured in one terminal, and the main functions of the NR MAC may include some of the following functions.
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2d-20, 2d-25 may channel-code and modulate upper layer data, convert the same into OFDM symbols, and transmit the same to the radio channel, or may demodulate an OFDM symbol received through a radio channel, decode the channel, and transmit the same to an upper layer.

Figure 2E:
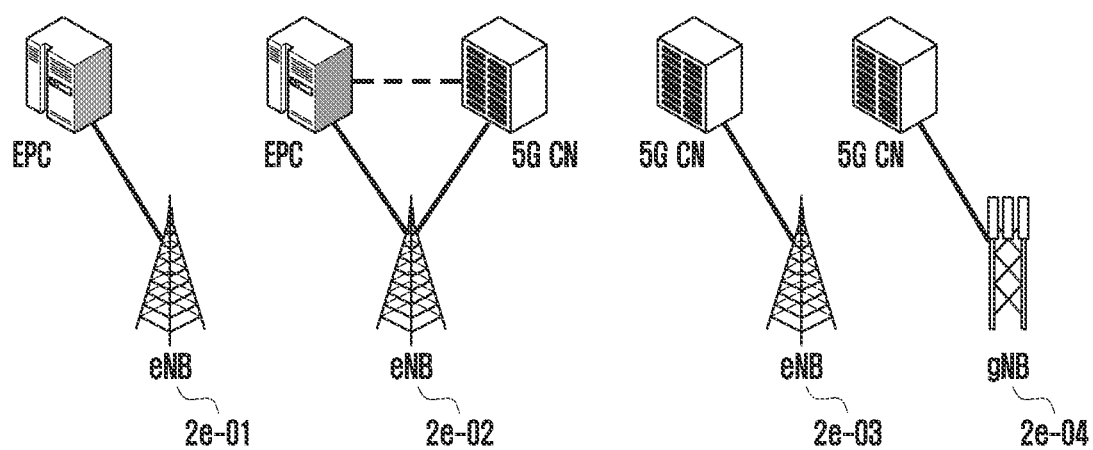
FIG. 2E is a diagram illustrating the connection relationship between an LTE base station (eNB), an NR base station (gNB), an evolved packet core (EPC, LTE core network), and a 5G core network (CN, NR core network) supported by a wireless communication system (LTE system, FIG. 2A) and a next-generation mobile communication system (NR system, FIG. 2C) in the disclosure.

FIG. 2E is a diagram illustrating the connection relationship between an LTE base station (eNB), an NR base station (gNB), an evolved packet core (EPC, LTE core network), and a 5G core network (CN, NR core network) supported by a wireless communication system (LTE system, FIG. 2A) and a next-generation mobile communication system (NR system, FIG. 2C) in the disclosure. The EPC is a network including a mobility management entity (MME), and the 5G CN is a network including an access management function (AMF).

According to an embodiment of the disclosure, in FIG. 2E, as shown in 2e-01, the case where only the LTE base station (eNB) and the EPC are connected can be supported, as shown in 2e-02, the case where both the LTE base station (eNB) and the EPC and 5G CN are connected can be supported, as shown in 2e-03, the case where only the LTE base station (eNB) and 5G CN are connected can be supported, and as shown in 2e-04, the case where only the NR base station (gNB) and 5G CN are connected can be supported.

The disclosure proposes to have an efficient paging message structure when transmitting a paging message when an LTE base station is connected to an EPC and a 5G CN as shown in 2e-02 described in FIG. 2e, so that the terminal registered in the EPC, the terminal registered in the 5G CN, the RRC idle mode terminal, or the RRC inactive mode terminal reads the paging message and can respond to the network.

The disclosure proposes a first identity that the LTE system can allocate to the terminal and a second identity that the NR system can allocate to the terminal, and proposes a procedure and a paging structure for a network to perform paging to a terminal using this.

In the above, the EPC of the LTE system may allocate a first unique identity (e.g., a globally unique temporary identity (GUTI)) that can be distinguished in the LTE system to the terminal that accesses for the first time. The first terminal identity (e.g., system architecture evolution (SAE)-temporary mobile subscriber identity) (S-TMSI)) that can be distinguished between the LTE base stations (access stratum) may be configured and used as a part of the first unique identity.

In addition, in the above, the 5G CN of the NR system may allocate a second unique identity (e.g., 5G-GUTI) that can be distinguished in the NR system to a terminal that accesses for the first time. In addition, a second terminal identity (e.g., 5G-S-TMSI) that can be distinguished between NR base stations (access stratum) may be configured and used as a part of the second unique identity.

In the above, the first unique identity and the second unique identity may be composed of a combination of a core network identity and a terminal identity, and in the case of the first unique identity, the first unique identity may consists of, for example, mobile country codes (MCC) (12 bits), mobile network codes (MNC) (12 bits), MME Group (16 bits), MME code (8 bits), MME-temporary mobile subscriber identity (M-TMSI) (32 bits) to have a size of 10 bytes (80 bits).

In addition, the lower 40 bits (least significant bit (LSB) 40 bits (MME code and M-TMSI)), which are part of the first unique identity, may be defined and used as a first terminal identity (e.g., S-TMSI).

Like the first unique identity, the second unique identity may be composed of a combination of a network identity and a terminal identity, and a second terminal identity (e.g., 5G-S-TMSI) can be defined and used.

Figure 2F:
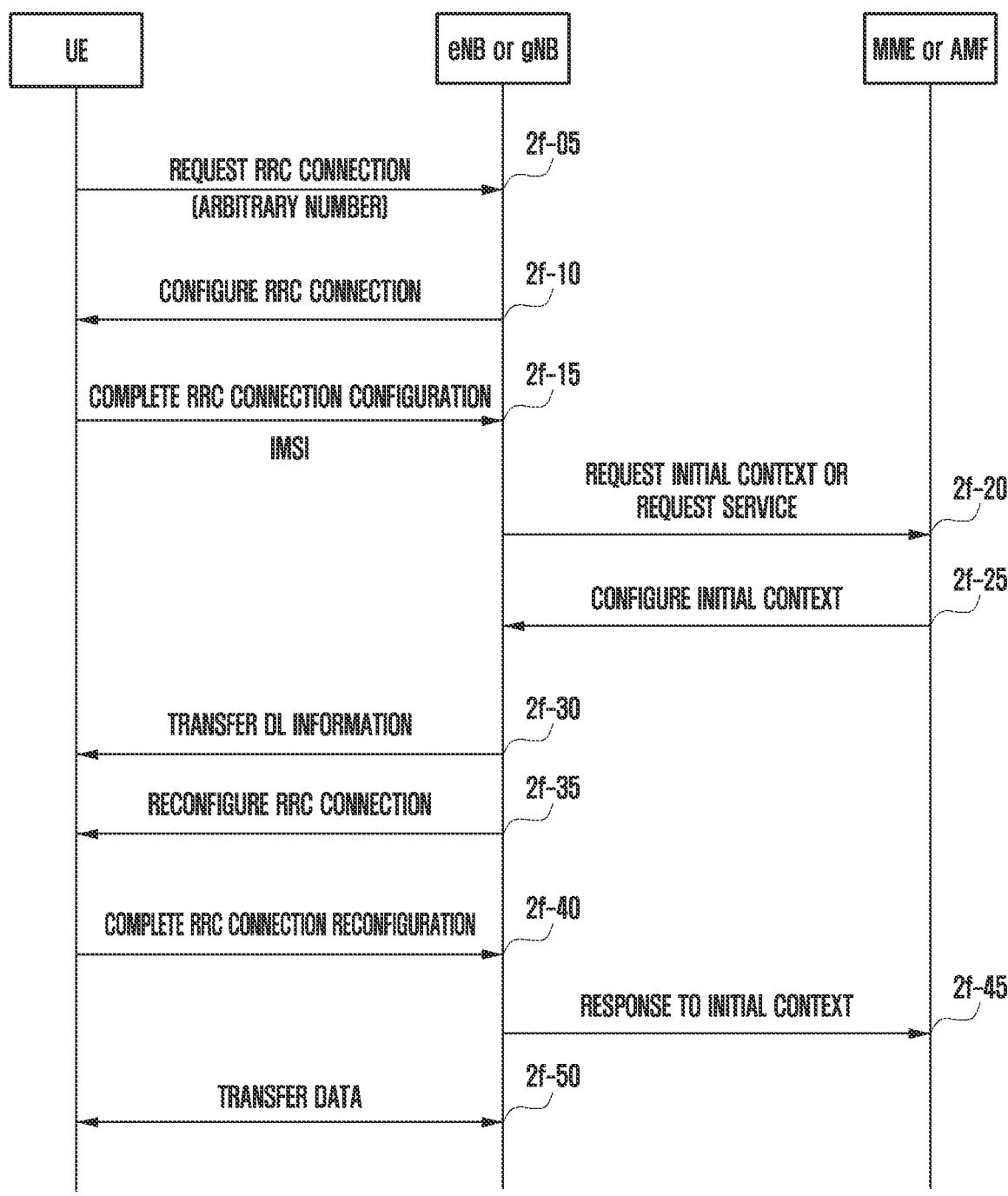
FIG. 2F is a diagram illustrating a procedure in which a terminal attempting to access a network for the first time is assigned a unique identity from the network and establishes a connection with the network in the disclosure.

FIG. 2F is a diagram illustrating a procedure in which a terminal attempting to access a network for the first time is assigned a unique identity from the network and establishes a connection with the network in the disclosure.

In the above, the terminal attempting to access the network for the first time means a terminal that has not previously registered the terminal in the LTE system and the NR system. That is, it means a terminal that has not been assigned a first unique identity or a second unique identity from the LTE system or the NR system.

In FIG. 2F, the terminal in the RRC idle mode starts to search for a cell when initially trying to access the network, and performs cell selection/reselection to find a suitable cell and camp-on. Then, the terminal synchronizes with the camped-on cell and performs a random access procedure. In the random access procedure, in order to enable the base station to perform contention resolution between the terminals when the terminal sends message 3 (e.g., 56 bits (8 bits MAC header and 48 bits CCCH SDU)) on the common control channel (CCCH), the terminal may transmit random values having a predetermined length (e.g., 40 bits) in message 3 (CCCH SDU) (2*f*-05).

The base station receiving the message 3 may copy the first 6 bytes of the received message 3 (CCCH SDU) in the same manner to resolve contention, and include the message in MAC control information (MAC Control element, Contention Resolution MAC CE) to transmit the same to the terminal with 4 (2*f*-10).

The terminal receiving the message 4 may identify the contention resolution and transmit the message 5 to the base station (2*f*-15). In the above, the terminal may transmit the terminal unique identity (e.g., international mobile subscriber identity (IMSI)) to the network in a NAS container (dedicatedInfoNAS) of the message 5, so that the network can identify the terminal unique identity and register the same in the network.

In the above, the base station receives message 5, identifies network information in message 5, and routes the message of the terminal to the core network. The base station may load the NAS container information included in the message 5 in a NAS message (e.g., INITIAL CONTEXT REQUEST) and transmit it to the core network (EPC or 5G CN) (2*f*-20).

The core network identifies the unique identity of the terminal, registers the terminal in the core network, decides to allocate a unique identity (first unique identity or second unique identity) that can distinguish the terminal in the network system (LTE system or NR system), and transmits the unique identity to the base station by including it in a NAS message (for example, INITIAL CONTEXT CONFIGURATION) to deliver the unique identity to the terminal (2*f*-25). The base station delivers the message to the terminal (2*f*-30).

When registered in the LTE system through the 2*f*-30 message, the terminal identifies the first unique identity, if registered in the NR system, identifies the second unique identity, and stores the same in the NAS layer device of the terminal (2*f*-30).

When the base station transmits an RRC Connection Reconfiguration message for RRC connection establishment (2*f*-35), the terminal receives the RRC message, receives each bearer configuration information to complete the configuration (2*f*-35), and completes connection configuration by sending an RRC Connection Reconfiguration Complete message to the base station (2*f*-40).

The base station also completes connection configuration with the terminal and transmits a response indicating that initial connection and context configuration have been completed to the core network (2*f*-45). In addition, the terminal completes connection configuration with the network and can exchange data (2*f*-50).

Figure 2G:
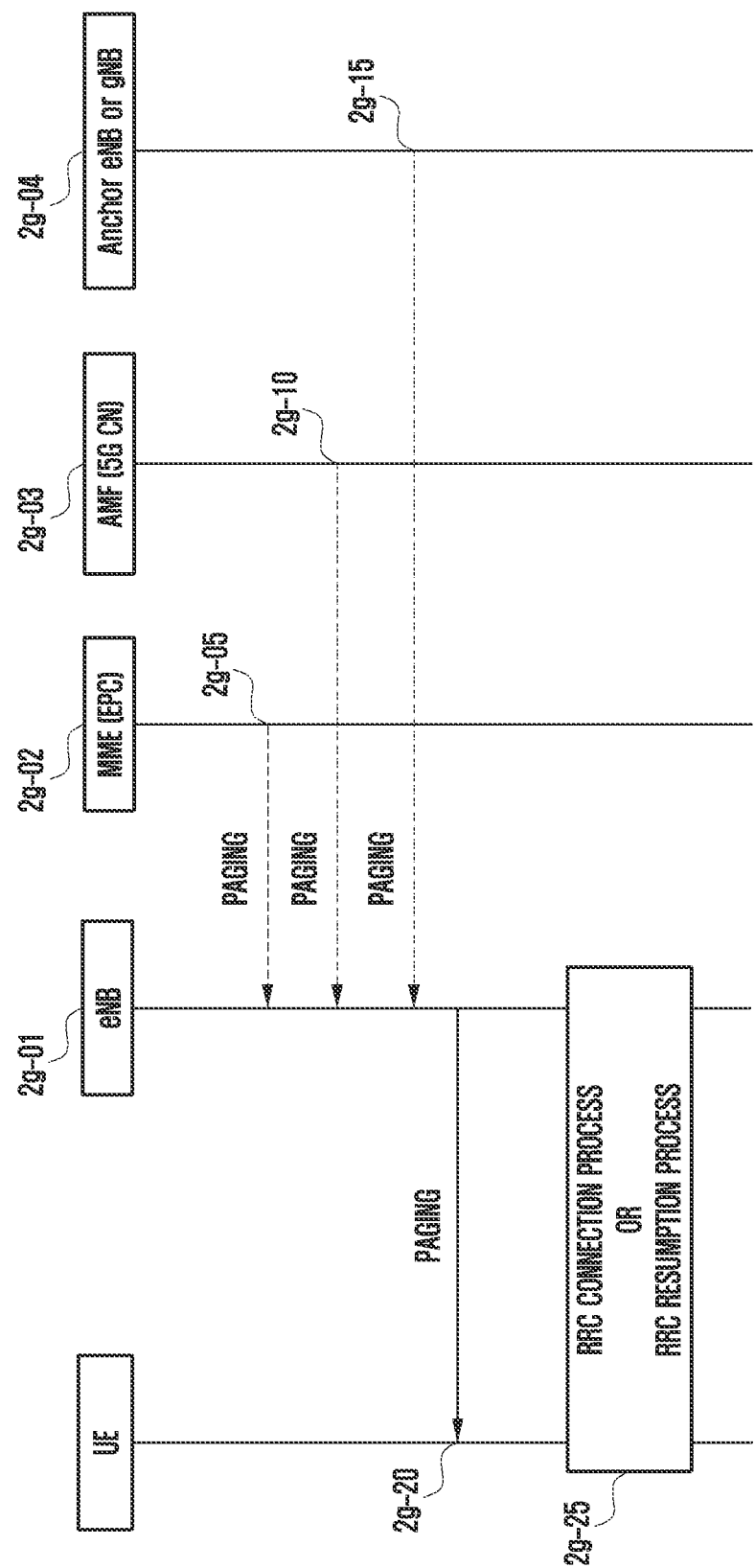
FIG. 2G is a diagram illustrating a procedure for generating a paging message by a base station receiving a paging request from a core network and transmitting the same to a terminal in the disclosure.

FIG. 2G is a diagram illustrating a procedure for generating a paging message by a base station receiving a paging request from a core network and transmitting the same to a terminal in the disclosure.

In FIG. 2G, the base station 2*g*-01 may receive a paging message or a paging request message from the MME or EPC 2*g*-02, AMF or 5G CN 2*g*-03, or the fixed base station 2*g*-04.

When receiving a paging request message from the MME or EPC 2*g*-02 (2*g*-05), the base station may identify the IMSI, S-TMSI, GUTI identity of a target terminal to receive paging in the paging request message. If the base station receives the paging request message from the AMF or 5G CN 2*g*-03 (2*g*-10), the base station may identify the IMSI, 5G-S-TMSI, or 5G-GUTI identity of the target terminal to receive paging in the paging request message. If the base station receives a paging request message from the fixed base station 2*g*-04 (2*g*-15), the base station may identify the I-RNTI or 5G-S-TMSI identity of the target terminal to receive paging in the paging request message.

The base station that has identified the identity of the target terminal (IMSI or S-TMSI or GUTI or 5G-S-TMSI or 5G-GUTI or I-RNTI) that should receive paging may configure a paging message and transmit the paging message to cells or coverages that the base station supports service (2g-20).

The terminal in the RRC idle mode or RRC inactive mode may perform camp-on on a cell, calculate paging frame (PF) and paging occasion (PO) with reference to system information, and monitor whether a paging message identity (P-RNTI) comes from a time and frequency resource (PO of PF) in which a paging message can come to the terminal. The paging identity may be monitored using the first paging identity (P-RNTI 1) if the terminal is registered with the EPC, and may be monitored using a second paging identity (P-RNTI 2) if the terminal is registered with the 5G CN. Alternatively, the paging identity may be monitored using a common paging identity (P-RNTI) regardless of whether the same is registered with the 5G CN and EPC.

When the terminal monitors the paging identity and receives a paging message, the terminal reads the paging message and identifies whether an identity matching the identity (IMSI, S-TMSI, GUTI, 5G-S-TMSI, 5G-GUTI, or I-RNTI) stored in the terminal is included (2g-20). When identifying the identity stored in the terminal in the paging message, if the terminal is in the RRC idle mode, the terminal performs an RRC connection configuration procedure to establish a connection with the network, and if the terminal is in the RRC inactivation mode, the terminal may perform an RRC connection resumption procedure to establish a connection with the network (2g-25).

In the following, the disclosure proposes an efficient paging message structure of an RRC message that can be used when a base station connected to an EPC and a 5G CN sends a paging message to a terminal as shown in 2g-20 in FIG. 2G.

Embodiment 2-1 of the efficient paging message structure proposed by the disclosure is as follows.

TABLE 1

```
-- ASN1START
PCCH-Message ::= SEQUENCE {
    message                 PCCH-MessageType
}
PCCH-MessageType ::= CHOICE {
```

TABLE 1-continued

```
    c1                      CHOICE {
        paging
    Paging
    },
    messageClassExtensionCHOICE {
        c2                  CHOICE {
            pagingNR        PagingNR
        },
        messageClassExtensionFuture SEQUENCE { }
    }
}
-- ASN1STOP
```

Table 1 shows a paging control channel (PCCH)-message according to embodiment 2-1 of the disclosure.

TABLE 2-1

```
-- ASN1START
Paging ::=                          SEQUENCE {
    pagingRecordList                    PagingRecordList
        OPTIONAL,                   -- Need ON
    systemInfoModification              ENUMERATED {true}
        OPTIONAL,                   -- Need ON
    etws-Indication                     ENUMERATED {true}
        OPTIONAL,                   -- Need ON
    nonCriticalExtension                Paging-v890-IEs
        OPTIONAL
}
Paging-v890-IEs ::=                 SEQUENCE {
    lateNonCriticalExtension            OCTET STRING
        OPTIONAL,
    nonCriticalExtension                Paging-v920-IEs
        OPTIONAL
}
Paging-v920-IEs ::=                 SEQUENCE {
    cmas-Indication-r9                  ENUMERATED {true}
        OPTIONAL,                   -- Need ON
    nonCriticalExtension                Paging-v1130-IEs
        OPTIONAL
}
Paging-v1130-IEs ::=                SEQUENCE {
    eab-ParamModification-r11           ENUMERATED {true}
        OPTIONAL,                   -- Need ON
    nonCriticalExtension                Paging-v1310-IEs
        OPTIONAL
}
```

TABLE 2-2

```
Paging-v1310-IEs ::=                SEQUENCE {
    redistributionIndication-r13        ENUMERATED {true}
        OPTIONAL,                   -- Need ON
    systemInfoModification-eDRX-r13     ENUMERATED {true}
        OPTIONAL,                   -- Need ON
    nonCriticalExtension                SEQUENCE { }
                                    OPTIONAL
}
PagingRecordList ::=                SEQUENCE (SIZE (1..maxPageRec)) OF
PagingRecord
PagingRecord                        SEQUENCE {
    ue-Identity                         PagingUE-Identity,
    cn-Domain                           ENUMERATED
    {ps, cs},
    ...
}
PagingUE-Identity ::=               CHOICE {
    s-TMSI                              S-TMSI,
    imsi                                IMSI,
    ...
}
IMSI ::=                            SEQUENCE (SIZE (6..21))
OF IMSI-Digit
```

TABLE 2-2-continued

```
IMSI-Digit ::=                              INTEGER (0..9)
-- ASN1STOP
```

It is preferable that Table 2-1 and Table 2-2 are understood to be connected to each other. Table 2-1 and Table 2-2 show the paging message according to embodiment 2-1 of the disclosure.

TABLE 3

```
-- ASN1START
PagingNR ::=                SEQUENCE {
    pagingRecordListNR              PagingRecordList
        OPTIONAL,       -- Need ON
    systemInfoModification          ENUMERATED {true}
        OPTIONAL,       -- Need ON
    etws-Indication                 ENUMERATED      {true}
                        OPTIONAL,   -- Need ON
    cmas-Indication             ENUMERATED {true}
        OPTIONAL,       -- Need ON
    nonCriticalExtension        SEQUENCE { }
        OPTIONAL
}
PagingRecordListNR ::=      SEQUENCE        (SIZE
(1..maxPageRec)) OF PagingRecordNR
PagiagRecordNR ::=          SEQUENCE {
    ue-Identity
    PagingUE-IdentityNR,
    cn-Domain               ENUMERATED
    {ps, cs},
    ...
}
PagingUE-IdentityNR ::=     CHOICE {
    5G-s-TMSI                       5G-S-TMSI,
    i-RNTI                  I-RNTI
    imsi                            IMSI,
    ...
}
IMSI ::=                        SEQUENCE (SIZE (6..21))
OF IMSI-Digit
IMSI-Digit ::=              INTEGER (0..9)
-- ASN1STOP
```

Table 3 shows the PagingNR message according to embodiment 2-1 of the disclosure.

As described above, embodiment 2-1 of the efficient paging message structure proposed by the disclosure is characterized in that a first paging message for processing a paging request message from an EPC and a second paging message for processing a paging request message from a 5G CN or a fixed base station are separately provided. Accordingly, as described above, indicators c1 and c2 may be introduced in a paging control channel (PCCH) message to indicate a first paging message (paging) or a second paging message (pagingNR).

In addition, as described above, a first paging message (paging) and a second paging message (pagingNR) may be respectively defined, and each may have the same structure as described above. It may be characterized in that the first paging message (paging) includes a first terminal identity (S-TMSI), and the second paging message (pagingNR) includes a second terminal identity (5G-S-TMSI) or an inactive terminal identity (I-RNTI).

Embodiment 2-1 of the paging message structure proposed by the disclosure has an advantage of reducing the processing burden of the terminal since the paging message structure separately has a first paging message for processing a paging request message from an EPC and a second paging message for processing a paging request message from a 5G CN or a fixed base station, and the first paging message or the second paging message is indicated as an indicator of the PCCH message.

For example, when the terminal receives a paging message, if the terminal has the first terminal identity (S-TMSI) because it is a terminal registered in the EPC, if the indicator of the PCCH message indicates the second paging message, there is no need to read the paging message anymore because the paging message is from the 5G CN. In addition, when the terminal receives the paging message, if the terminal has a second terminal identity (5G-S-TMSI) or an inactive terminal identity (I-RNTI) because it is a terminal registered in 5G CN, if the indicator of the PCCH message indicates the first paging message, there is no need to read the paging message anymore because the paging message is from the EPC.

Embodiment 2-2 of the efficient paging message structure proposed by the disclosure is as follows.

TABLE 4

```
-- ASN1START
PCCH-Message ::= SEQUENCE {
    message             PCCH-MessageType
}
PCCH-MessageType ::= CHOICE {
    c1                          CHOICE {
        paging
```

TABLE 4-continued

```
        Paging
    },
    messageClassExtensionSEQUENCE { }
}
-- ASN1STOP
```

Table 4 shows a PCCH-Message according to embodiment 2-2 of the disclosure.

TABLE 5-1

```
-- ASN1START
Paging ::=                          SEQUENCE {
    pagingRecordList                PagingRecordList
            OPTIONAL,    -- Need ON
    systemInfoModification          ENUMERATED {true}
            OPTIONAL,    -- Need ON
    etws-Indication                 ENUMERATED {true}
            OPTIONAL,    -- Need ON
    nonCrincalExtension             Paging-v890-IEs
            OPTIONAL
}
Paging-v890-IEs ::=                 SEQUENCE {
    lateNonCriticalExtension        OCTET STRING
```

TABLE 5-1-continued

```
            OPTIONAL,
    nonCriticalExtension            Paging-v920-IEs
            OPTIONAL
}
Paging-v920-IEs ::=                 SEQUENCE {
    cmas-Indication-r9              ENUMERATED {true}
            OPTIONAL,    -- Need ON
    nonCriticalExtension            Paging-v1130-IEs
            OPTIONAL
}
Paging-v1130-IEs ::=                SEQUENCE {
    eab-ParamModification-r11       ENUMERATED {true}
            OPTIONAL,    -- Need ON
    nonCriticalExtension            Paging-v1310-IEs
            OPTIONAL
}
Paging-v1310-IEs ::=                SEQUENCE {
    redistributionIndication-r13    ENUMERATED {true}
            OPTIONAL,    -- Need ON
    systemInfoModification-eDRX-r13 ENUMERATED {true}
            OPTIONAL,    -- Need ON
    nonCriticalExtension            Paging-vXXX-IEs { }
            OPTIONAL
}
```

TABLE 5-2

```
Paging-vXXX-IEs ::=       SEQUENCE {
    pagingRecordListNR            PagingRecordListNR
        OPTIONAL,    -- Need ON
    nonCriticalExtension      SEQUENCE { }
        OPTIONAL
},
PagingRecordList ::=      SEQUENCE (SIZE (1..maxPageRec))    OF
PagingRecord
PagingRecord ::=          SEQUENCE {
    ue-Identity                   PagingUE-Identity,
    cn-Domain                     ENUMERATED
    {ps, cs},
    ...
}
PagingUE-Identity ::=     CHOICE {
    s-TMSI                        S-TMSI,
    imsi                          IMSI,
    ...
}
PagingRecordListNR ::=    SEQUENCE          (SIZE
(1..maxPageRec)) OF PagingRecordNR
PagingRecordNR ::=        SEQUENCE {
    ue-Identity
    PagingUE-IdentityNR,
    cn-Domain                     ENUMERATED
    {ps, cs},
    ...
}
PagingUE-IdentityNR ::=   CHOICE {
    5G-s-TMSI                     5G-S-TMSI,
    i-RNTI          I-RNTI
    imsi                          IMSI,
    ...
}
IMSI ::=                  SEQUENCE (SIZE (6..21))
OF IMSI-Digit
IMSI-Digit ::=            INTEGER (0..9)
-- ASN1STOP
```

It is preferable that Table 5-1 and Table 5-2 are understood to be connected to each other. Table 5-1 and Table 5-2 show the paging message according to embodiment 2-2 of the disclosure.

Embodiment 2-2 of the efficient paging message structure proposed by the disclosure as described above is characterized in that a first paging record list for processing a paging request message from an EPC and a second paging record list for processing a paging request message from a 5G CN or a fixed base station are separately provided, and the first paging record list and the second paging record list have a structure in which one common paging message is included. Accordingly, a first paging record list (pagingRecordList) is included in the common paging message as described above, and a second paging record list (pagingRecordListNR) can be included in one common paging message by using an extension indicator (nonCriticalExtension).

That is, as described above, a first paging record list (pagingRecordList) and a second paging record list (pagingRecordListNR) may be respectively defined, and each may have the same structure as described above. It may be characterized in that the first paging record list (pagingRecordList) includes a first terminal identity (S-TMSI) and the second paging record list (pagingRecordListNR) includes a second terminal identity (5G-S-TMSI) or an inactive terminal identity (I-RNTI).

Embodiment 2-2 of the paging message structure proposed in the disclosure has an advantage of reducing the processing burden on the terminal since the paging message structure has a first paging record list (pagingRecordList) for processing a paging request message from an EPC and a second paging record list (pagingRecordListNR) for processing a paging request message from a 5G CN or a fixed base station separately, and the first paging record list or the second paging record list is indicated as an extension indicator of a common paging message. For example, when the terminal receives a paging message, if the terminal has the first terminal identity (S-TMSI) because it is a terminal registered in the EPC, there is no need to the second paging record list indicated by the extension indicator of the paging message any more.

Embodiment 2-3 of the efficient paging message structure proposed by the disclosure are as follows.

TABLE 6

```
-- ASN1START
PCCH-Message ::= SEQUENCE {
    message                      PCCH-MessageType
}
PCCH-MassageType ::= CHOICE {
    c1                           CHOICE {
```

TABLE 6-continued

```
        paging
    Paging
    },
    messageClassExtensionCHOICE {
        c2                           CHOICE {
            pagingNR                 PagingNR
        },
        messageClassExtemionFuture-r13   SEQUENCE { }
    }
}
-- ASN1STOP
```

Table 6 shows the PCCH-Message according to embodiment 2-3 of the disclosure.

TABLE 7-1

```
-- ASN1START
Paging                                SEQUENCE {
    pagingRecordList                  PagingRecordList
        OPTIONAL,                     -- Need ON
    systemInfoModification            ENUMERATED {true}
        OPTIONAL,                     -- Need ON
    etws-Indication                   ENUMERATED {true}
        OPTIONAL,                     -- Need ON
    nonCriticalExtension              Paging-v890-IEs
        OPTIONAL
}
Paging-v890-IEs ::=                   SEQUENCE {
    lateNonCriticalExtension          OCTET STRING
        OPTIONAL,
    nonCriticalExtension              Paging-v920-IEs
        OPTIONAL
}
Paging-v920-IEs ::=                   SEQUENCE {
    cmas-Indication-r9                ENUMERATED {true}
        OPTIONAL,                     -- Need ON
    nonCriticalExtension              Paging-v1130-IEs
        OPTIONAL
}
Paging-v1130-IEs ::=                  SEQUENCE {
    eab-ParamModification-r11         ENUMERATED {true}
        OPTIONAL,                     -- Need ON
    nonCriticalExtension              Paging-v1310-IEs
        OPTIONAL
}
```

TABLE 7-2

```
Paging-v1310-IEs ::=                  SEQUENCE {
    redistributionIndication-r13      ENUMERATED {true}
        OPTIONAL,                     -- Need ON
    systemInfoModification-eDRX-r13   ENUMERATED {true}
        OPTIONAL,                     -- Need ON
    nonCriticalExtension              SEQUENCE { }
        OPTIONAL
}
PagingReccrdList ::=                  SEQUENCE (SIZE (1..maxPageRec)) OF
    PagingRecord
PagingRecord ::=                      SEQUENCE {
    ue-Identity                       PagingUE-Identity,
    cn-Domain                         ENUMERATED
```

TABLE 7-2-continued

```
    {ps, cs},
    ...
}
PagingUE-Identity ::=           CHOICE {
    s-TMSI                              S-TMSI,
    imsi                                IMSI,
    5G-S-TMSI                           5G-S-TMSI,
    i-RNTI                              I-RNTI,
    ...
}
IMSI::=                                 SEQUENCE (SIZE (6..21))
OF IMSI-Digit
IMSI-Digit ::=                  INTEGER (0..9)
-- ASN1STOP
```

It is preferable that Table 7-1 and Table 7-2 are understood to be connected to each other. Table 7-1 and Table 7-2 show paging messages according to embodiment 2-3 of the disclosure.

As described above, embodiment 2-3 of the efficient paging message structure proposed by the disclosure has a first terminal identity for processing a paging request message from an EPC and a second terminal identity (5G-S-TMSI) for processing a paging request message from a 5G CN or a fixed base station or inactive terminal identity (I-RNTI) separately, and is characterized by having a structure including a first terminal identity (S-TMSI), a second terminal identity (5G-S-TMSI) in the paging identity (PagingUE-Identity), or an inactive terminal identity (I-RNTI) in one common paging message, in one paging record list, or in one paging record.

That is, as described above, a first terminal identity (S-TMSI), a second terminal identity (5G-S-TMSI), or an inactive terminal identity (I-RNTI) may be included in one paging record's paging identity (PagingUE-Identity), in one paging record list, in one common paging message, respectively.

Since Embodiment 2-3 of the paging message structure proposed by the disclosure has the simplest structure, it is possible to simplify the implementation of the paging message generation by the base station, and to always transmit the same paging message. Accordingly, the terminal needs to always perform processing to read the same paging message, and only need to distinguish and check the paging identity (PagingUE-Identity).

Figure 2H:
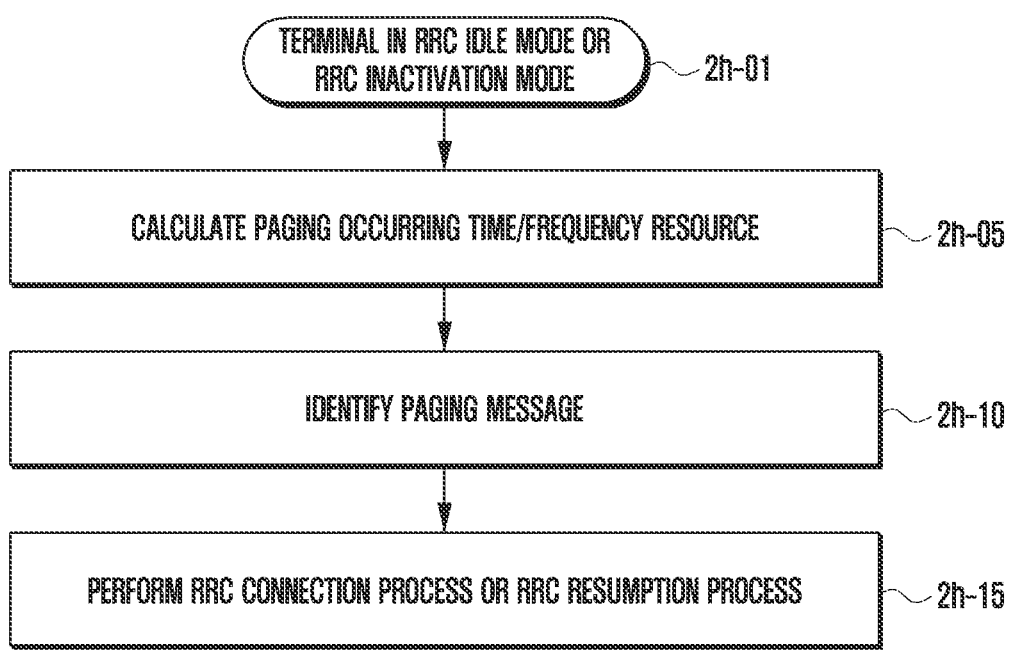
FIG. 2H is a diagram illustrating an operation of a terminal proposed in the disclosure.
Figure 21:
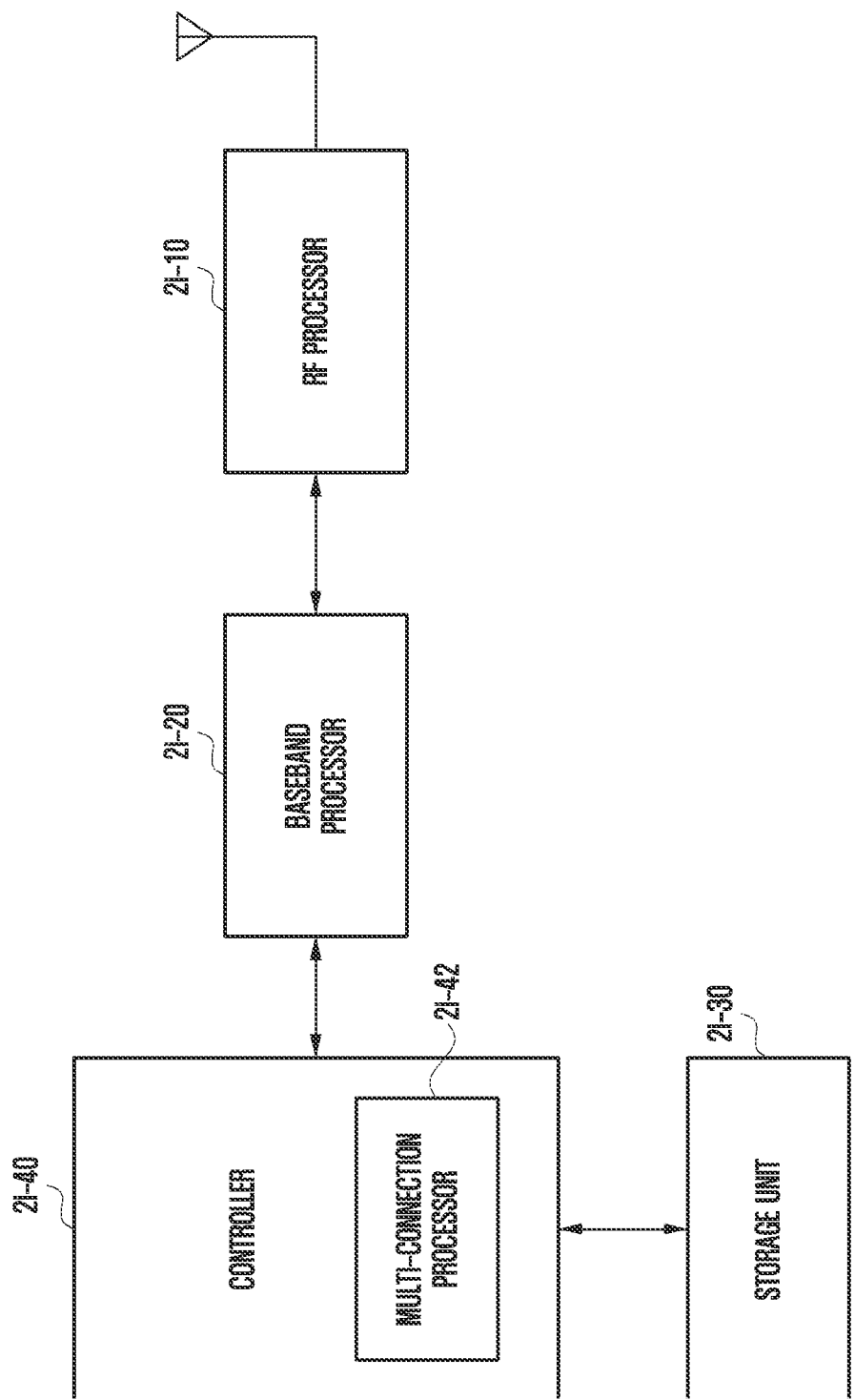

FIG. 2H is a diagram illustrating an operation of a terminal proposed in the disclosure.

In FIG. 2H, the terminal (2h-01) in the RRC idle mode or the RRC inactivation mode may perform camp-on on a random cell, calculate a paging frame (PF) and a paging occasion (PO) with reference to system information, and monitor whether a paging message identity (P-RNTI) comes from a time and frequency resource (PO of PF) in which a paging message can come to the terminal (2h-05). The paging identity may be monitored using the first paging identity (P-RNTI 1) if the terminal is registered with the EPC, and may be monitored using a second paging identity (P-RNTI 2) if the terminal is registered with the 5G CN.

Alternatively, it is possible to monitor using a common paging identity (P-RNTI) regardless of whether or not registered with the 5G CN and EPC. When the terminal monitors the paging identity and receives the paging message, the terminal reads the paging message and checks whether an identity matching the identity (IMSI, S-TMSI, GUTI, 5G-S-TMSI, 5G-GUTI, or I-RNTI) stored in the terminal is included (2h-10). The paging message structure may have the same structure as the 2-1 embodiment, 2-2 embodiment, or –3 embodiment proposed in the disclosure.

When checking the identity stored in the terminal in the paging message, if the terminal is in RRC idle mode, the terminal may perform an RRC connection configuration procedure to establish a connection with the network, and if the terminal is in the RRC inactivation mode, the terminal may perform an RRC connection resumption procedure to establish a connection with the network (2h-15).

FIG. 2I is a diagram illustrating a structure of a terminal to which an embodiment of the disclosure can be applied.

Referring to FIG. 2I, the terminal includes a radio frequency (RF) processor 2i-10, a baseband processor 2i-20, a storage unit 2i-30, and a controller 2i-40.

The RF processor 2i-10 performs a function of transmitting and receiving a signal through a wireless channel such as band conversion and amplification of a signal. That is, the RF processor 2i-10 up-converts the baseband signal provided from the baseband processor 2i-20 to an RF band signal and then transmits the same through an antenna, and down-converts an RF band signal received through the antenna to a baseband signal. For example, the RF processor 2i-10 may include a transmission filter, a reception filter, an amplifier, a mixer, an oscillator, a digital to analog convertor (DAC), an analog to digital convertor (ADC), and the like.

In FIG. 2I, only one antenna is shown, but the terminal may include a plurality of antennas. In addition, the RF processor 2i-10 may include a plurality of RF chains. Furthermore, the RF processor 2i-10 may perform beamforming. For beamforming, the RF processor 2i-10 may adjust a phase and a magnitude of each of signals transmitted/received through a plurality of antennas or antenna elements. In addition, the RF processor 2i-10 may perform multiple input multiple output (MIMO), and may receive multiple layers when performing a MIMO operation. The RF processor 2i-10 may perform reception beam sweeping by appropriately configuring a plurality of antennas or antenna elements under control of the controller, or adjust the direction and beam width of the reception beam so that the reception beam cooperates with the transmission beam.

The baseband processor 2i-20 performs a function of converting between a baseband signal and a bit stream according to the physical layer standard of the system. For example, when transmitting data, the baseband processor 2i-20 generates complex symbols by encoding and modulating a transmission bit stream. In addition, when receiving data, the baseband processor 2i-20 restores a received bit stream through demodulation and decoding of the baseband signal provided from the RF processor 2i-10.

For example, in the case of the orthogonal frequency division multiplexing (OFDM) scheme, when transmitting data, the baseband processor 2*i*-20 generates complex symbols by encoding and modulating a transmission bit stream, subcarriers the complex symbols, maps the complex symbols to subcarriers, and then constructs OFDM symbols by performing an inverse fast Fourier transform (IFFT) operation and inserting a cyclic prefix (CP). In addition, when receiving data, the baseband processor 2*i*-20 divides the baseband signal provided from the RF processor 2*i*-10 in units of OFDM symbols, restores signals mapped to subcarriers through a fast Fourier transform (FFT) operation, and then restores a received bit sequence through demodulation and decoding.

The baseband processor 2*i*-20 and the RF processor 2*i*-10 transmit and receive signals as described above. Accordingly, the baseband processor 2*i*-20 and the RF processor 2*i*-10 may be referred to as a transmitter, a receiver, a transceiver, or a communication unit. Furthermore, at least one of the baseband processor 2*i*-20 and the RF processor 2*i*-10 may include a plurality of communication modules to support a plurality of different wireless access technologies. In addition, at least one of the baseband processor 2*i*-20 and the RF processor 2*i*-10 may include different communication modules to process signals of different frequency bands. For example, the different radio access technologies may include an LTE network, an NR network, and the like. In addition, the different frequency bands may include a super high frequency (SHF) (e.g., 2.2 gHz, 2 ghz) band, and a millimeter wave (e.g., 60 GHz) band.

The storage unit 2*i*-30 stores data such as a basic program, an application program, and configuration information for the operation of the terminal. The storage unit 2*i*-30 provides stored data according to the request of the controller 2*i*-40.

The controller 2*i*-40 controls overall operations of the terminal. For example, the controller 2*i*-40 transmits and receives signals through the baseband processor 2*i*-20 and the RF processor 2*i*-10. Further, the controller 2*i*-40 writes and reads data in the storage unit 2*i*-30. To this end, the controller 2*i*-40 may include at least one processor. For example, the controller 2*i*-40 may include a communication processor (CP) that controls communication and an application processor (AP) that controls an upper layer such as an application program.

Figure 2J:
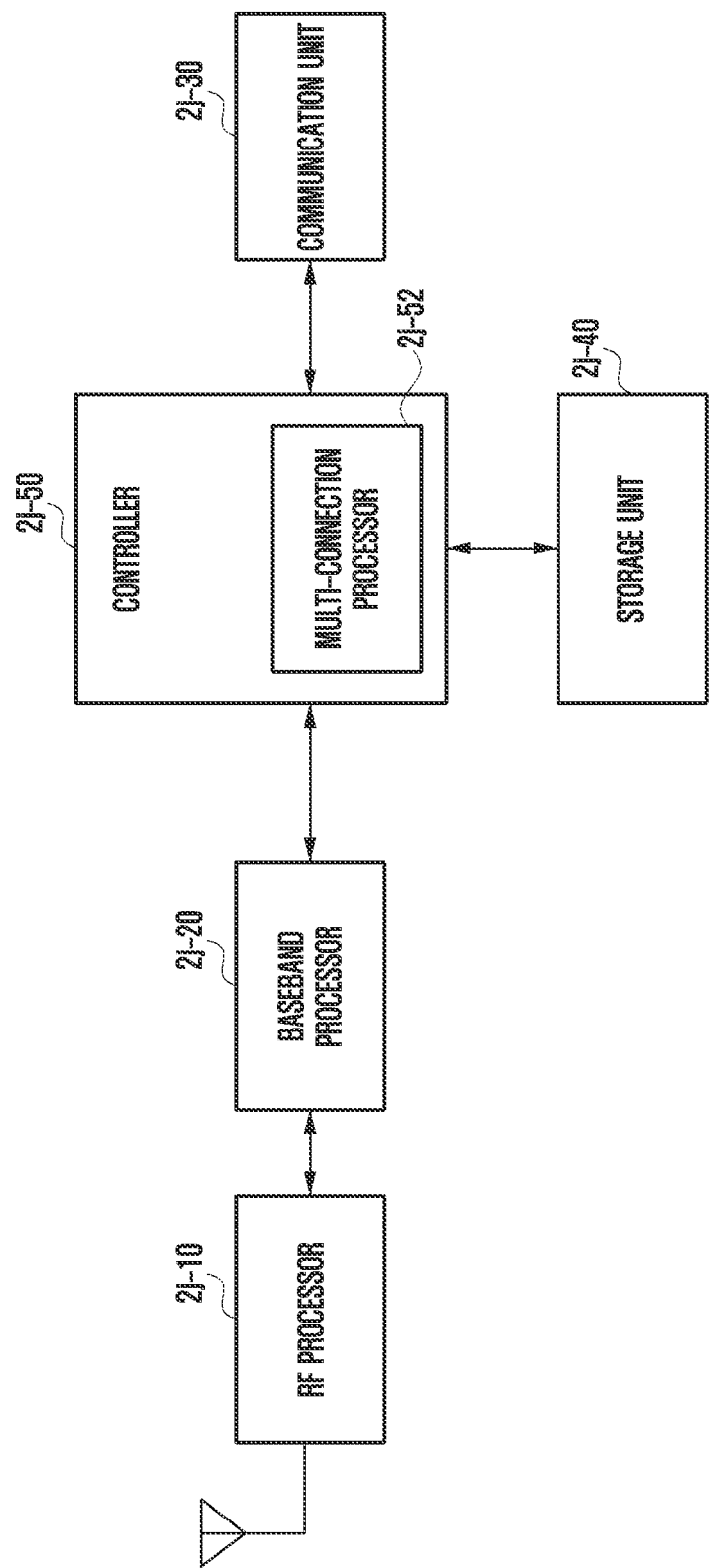
FIG. 2J is a diagram illustrating a block configuration of a TRP in a wireless communication system to which an embodiment of the disclosure can be applied.

FIG. 2J is a diagram illustrating a block configuration of a transmission point (TRP) in a wireless communication system to which an embodiment of the disclosure can be applied.

As shown in FIG. 2J, the TRP (hereinafter referred to as "base station") includes an RF processor 2*j*-10, a baseband processor 2*j*-20, a backhaul communication unit 2*j*-30, a storage unit 2*j*-40, and a controller 2*j*-50.

The RF processor 2*j*-10 performs a function for transmitting and receiving a signal through a wireless channel such as band conversion and amplification of a signal. That is, the RF processor 2*j*-10 up-converts the baseband signal provided from the baseband processor 2*j*-20 into an RF band signal, transmits it through an antenna, and down-converts the RF band signal received through the antenna into a baseband signal. For example, the RF processor 2*j*-10 may include a transmission filter, a reception filter, an amplifier, a mixer, an oscillator, a DAC, an ADC, and the like. In the drawing, only one antenna is shown, but the first access node may include a plurality of antennas. In addition, the RF processing unit 2*j*-10 may include a plurality of RF chains. Furthermore, the RF processor 2*j*-10 may perform beamforming. For beamforming, the RF processor 2*j*-10 may adjust a phase and a magnitude of each of signals transmitted and received through a plurality of antennas or antenna elements. The RF processor may perform a downlink MIMO operation by transmitting one or more layers.

The baseband processor 2*j*-20 performs a function of converting between a baseband signal and a bit stream according to the physical layer standard of the first wireless access technology. For example, when transmitting data, the baseband processor 2*j*-20 generates complex symbols by encoding and modulating a transmission bit stream. In addition, when receiving data, the baseband processor 2*j*-20 restores a received bit stream through demodulation and decoding of the baseband signal provided from the RF processor 2*j*-10. For example, in the case of the OFDM scheme, when transmitting data, the baseband processor 2*j*-20 generates complex symbols by encoding and modulating a transmission bit stream, maps the complex symbols to subcarriers and then constructs OFDM symbols through IFFT operation and CP insertion.

In addition, when receiving data, the baseband processor 2*j*-20 divides the baseband signal provided from the RF processor 2*j*-10 in units of OFDM symbols, restores signals mapped to subcarriers through an FFT operation, and then restores a received bit stream through demodulation and decoding. The baseband processor 2*j*-20 and the RF processor 2*j*-10 transmit and receive signals as described above. Accordingly, the baseband processor 2*j*-20 and the RF processor 2*j*-10 may be referred to as a transmitter, a receiver, a transceiver, a communication unit, or a wireless communication unit.

The backhaul communication unit 2*j*-30 provides an interface for performing communication with other nodes in the network.

The storage unit 2*j*-40 stores data such as a basic program, an application program, and configuration information for the operation of the main station. In particular, the storage unit 2*j*-40 may store information on bearers allocated to the connected terminal, measurement results reported from the connected terminal, and the like. In addition, the storage unit 2*j*-40 may store information that is a criterion for determining whether to provide multiple connections to the terminal or stop. In addition, the storage unit 2*j*-40 provides stored data according to the request of the control unit 2*j*-50.

The controller 2*j*-50 controls overall operations of the main station. For example, the controller 2*j*-50 transmits and receives signals through the baseband processor 2*j*-20 and the RF processor 2*j*-10 or through the backhaul communication unit 2*j*-30. The controller 2*j*-50 writes and reads data in the storage unit 2*j*-40. To this end, the controller 2*j*-50 may include at least one processor.

The invention claimed is:

1. A method performed by a terminal in a communication system, the method comprising:
   receiving, from a base station, a paging message for paging including at least one paging record;
   identifying a paging record of the at least one paging record that includes a paging user equipment (UE) identity matched with an identity allocated to the terminal; and
   performing a procedure for a radio resource control (RRC) connection based on the paging UE identity included in the identified paging record,
   wherein the paging message is monitored based on a first paging-radio network temporary identifier (RNTI) (p-RNTI), in case that the terminal is registered in an evolved packet core (EPC), and the paging message is monitored based on a second p-RNTI, in case that the terminal is registered in a 5th-generation (5G) core network, wherein the paging UE identity included in the identified paging record is one of a first identity of a core network, or a second identity of the base station, and wherein the procedure for the RRC connection includes an RRC connection establishment procedure or an RRC connection resume procedure.

2. The method of claim 1, wherein the first identity is a (5G) system architecture evolution temporary mobile subscriber identity (S-TMSI) (5G-S-TMSI), and the second identity is an I-radio network temporary identity (I-RNTI).

3. A method performed by a base station in a communication system, the method comprising:

transmitting, to a terminal, a paging message for paging including at least one paging record; and performing a procedure for a radio resource control (RRC) connection with the terminal based on the paging message, wherein a transmission associated with the paging message is based on a first paging-radio network temporary identifier (RNTI) (p-RNTI) in case that the terminal is registered in an evolved packet core (EPC), and the transmission associated with the paging message is based on a second p-RNTI in case that the terminal is registered in a 5th-generation (5G) core network, wherein a paging user equipment (UE) identity included in an identified paging record is one of a first identity of a core network, or a second identity of the base station, and wherein the procedure for the RRC connection includes an RRC connection establishment procedure or an RRC connection resume procedure.

4. The method of claim 3, wherein the first identity is a 5G system architecture evolution-temporary mobile subscriber identity (S-TMSI) (5G-S-TMSI), and the second identity is an I-radio network temporary identity (I-RNTI).

5. A terminal in a communication system, the terminal comprising:

a transceiver; and a controller configured to:

receive, via the transceiver from a base station, a paging message for paging including at least one paging record, identify a paging record of the at least one paging record that includes a paging user equipment (UE) identity matched with an identity allocated to the terminal, and perform a procedure for a radio resource control (RRC) connection based on the paging UE identity included in the identified paging record, wherein the paging message is monitored based on a first paging-radio network temporary identifier (RNTI) (p-RNTI), in case that the terminal is registered in an evolved packet core (EPC), and the paging message is monitored based on a second p-RNTI, in case that the terminal is registered in a 5th-generation (5G) core network, wherein the paging UE identity included in the identified paging record is one of a first identity of a core network or a second identity of the base station, and wherein the procedure for the RRC connection includes an RRC connection establishment procedure or an RRC connection resume procedure.

6. The terminal of claim 5, wherein the first identity is 5G system architecture evolution temporary mobile subscriber identity (S-TMSI) (5G-S-TMSI), and the second identity is an I-radio network temporary identity (I-RNTI).

7. A base station in a communication system, the base station comprising:

a transceiver; and a controller configured to:

transmit, via the transceiver to a terminal, a paging message for paging including at least one paging record; and perform a procedure for a radio resource control (RRC) connection with the terminal based on the paging message, wherein a transmission associated with the paging message is based on a first paging-radio network temporary identifier (RNTI) (p-RNTI) in case that the terminal is registered in an evolved packet core (EPC), and the transmission associated with the paging message is based on a second p-RNTI in case that the terminal is registered in a 5th-generation (5G) core network, wherein a paging user equipment (UE) identity included in an identified paging record is one of a first identity of a core network, or a second identity of the base station, and wherein the procedure for the RRC connection includes an RRC connection establishment procedure or an RRC connection resume procedure.

8. The base station of claim 7, wherein the first identity is a 5G system architecture evolution-temporary mobile subscriber identity (S-TMSI) (5G-S-TMSI), and the second identity is an I-radio network temporary identity (I-RNTI).

* * * * *